United States Patent
Chang

(10) Patent No.: US 10,601,329 B2
(45) Date of Patent: Mar. 24, 2020

(54) SWITCHING REGULATOR AND POWER SWITCH CONTROLLER CIRCUIT THEREOF

(71) Applicant: RICHTEK TECHNOLOGY CORPORATION, Zhubei, HsinChu (TW)

(72) Inventor: Yu-Wen Chang, Nantou (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 16/436,782

(22) Filed: Jun. 10, 2019

(65) Prior Publication Data

US 2020/0014304 A1 Jan. 9, 2020

Related U.S. Application Data

(60) Provisional application No. 62/694,012, filed on Jul. 4, 2018.

(30) Foreign Application Priority Data

Mar. 21, 2019 (CN) .......................... 2019 1 0216459

(51) Int. Cl.
*H02M 3/335* (2006.01)
*H02M 1/36* (2007.01)
(Continued)

(52) U.S. Cl.
CPC ......... *H02M 3/33569* (2013.01); *H02M 1/08* (2013.01); *H02M 1/36* (2013.01);
(Continued)

(58) Field of Classification Search
CPC ........... H02M 3/33538; H02M 3/3353; H02M 3/33515; H02M 3/33507; H02M 3/325; H02M 3/335; H02M 3/33569; H02M 1/08; H02M 1/36; H02M 2001/0009; H02M 2001/0025
See application file for complete search history.

(56) References Cited

U.S. PATENT DOCUMENTS

| 6,944,034 B1 * | 9/2005 | Shteynberg ......... H02M 1/4258 323/282 |
| 2007/0171683 A1 * | 7/2007 | Sukup ..................... H02M 1/36 363/21.04 |

(Continued)

*Primary Examiner* — Adolf D Berhane
(74) *Attorney, Agent, or Firm* — Tung & Associates

(57) ABSTRACT

A switching regulator includes a power stage circuit, an auxiliary winding, a start-up switch, and a power switch controller circuit. The power switch controller circuit includes a multifunction pin, a start-up controller circuit, and a feedback compensation circuit. The multifunction pin is coupled to a control terminal of the start-up switch, to deliver different signals with different functions under at least two different modes, respectively. The start-up controller circuit generates a start-up signal in a start-up mode, wherein the start-up signal is delivered to a control terminal of the start-up switch through the multifunction pin. An output terminal of the feedback compensation circuit is coupled to the multifunction pin, to provide a compensation signal at the multifunction pin in an operation mode.

26 Claims, 14 Drawing Sheets

(51) Int. Cl.
  *H02M 1/08* (2006.01)
  *H02M 1/00* (2006.01)
(52) U.S. Cl.
  CPC ............... *H02M 2001/0009* (2013.01); *H02M 2001/0025* (2013.01)

(56) References Cited

U.S. PATENT DOCUMENTS

| | | | |
|---|---|---|---|
| 2011/0096574 A1* | 4/2011 | Huang | H02M 3/33507 363/21.18 |
| 2012/0014145 A1* | 1/2012 | Koike | H02M 1/36 363/49 |
| 2013/0235621 A1* | 9/2013 | Yan | H02M 3/33507 363/21.12 |
| 2014/0268913 A1* | 9/2014 | Zheng | H02M 7/2176 363/21.13 |
| 2015/0381054 A1* | 12/2015 | Chang | H02M 3/33507 315/294 |
| 2017/0302185 A1* | 10/2017 | Tao | H02M 3/33592 |
| 2018/0123581 A1* | 5/2018 | Chiu | H02M 3/1563 |
| 2019/0013737 A1* | 1/2019 | Lin | H02M 3/3353 |

* cited by examiner

SWITCHING REGULATOR AND POWER SWITCH CONTROLLER CIRCUIT THEREOF

CROSS REFERENCE

The present invention claims priority to U.S. 62/694,012, filed on Jul. 4, 2018 and claims priority to CN 201910216459.8, filed on Mar. 21, 2019.

BACKGROUND OF THE INVENTION

Field of Invention

The present invention relates to a switching regulator; particularly, it relates to such switching regulator having a multifunction pin for performing plural functions. The present invention also relates to a power switch controller circuit of a switching regulator.

Description of Related Art

Relevant prior arts of the present invention are US Application Patent No. 2017/0005583 A1 and CN Applications Patent No. 106329961A.

Please refer to FIG. 1, which shows a schematic diagram of a conventional switching regulator (i.e., switching regulator 1). The switching regulator 1 comprises: a transformer 110, a rectifying circuit 120, a primary side controller circuit 130, an auxiliary winding WA and a start-up switch SSU. The auxiliary winding WA is coupled to the transformer 110 and is configured to operably generate a controller supply voltage VDD, to supply power to the primary side controller circuit 130. Besides, during a start-up stage (i.e., under a start-up mode), when the controller supply voltage VDD is lower than a start-up voltage threshold, the switching regulator 1 can turn ON the start-up switch SSU through a pin ASU, whereby the input voltage VIN directly charges a supply capacitor CDD to rapidly raise the controller supply voltage VDD to a desired level, to complete the start-up stage.

The prior art shown in FIG. 1 has a drawback in that: because the primary side controller circuit 130 is an integrated circuit (IC) chip, a dedicated pin ASU is required for the primary side controller circuit 130 to control the start-up switch SSU during the start-upstage. However, this dedicated pin ASU does not perform any other function during the rest stages of the operation. Consequently and undesirably, this dedicated pin increases the size of the IC chip and the manufacturing cost.

As compared to the prior art shown in FIG. 1, the present invention can control the start-up switch SSU via a multifunction pin, and after the start-up stage has been completed, other functions can be performed via the multifunction pin. Consequently and desirably, the size and the manufacturing cost of the IC chip are decreased.

SUMMARY OF THE INVENTION

From one perspective, the present invention provides a switching regulator, comprising: a power stage circuit, including an inductor and at least one power switch; wherein the least one power switch is coupled to the inductor and is configured to operate according to a switch control signal, to control a conduction status of the inductor, thereby converting an input power to an output power; an auxiliary winding, wherein the auxiliary winding and the inductor form a transformer, to generate a controller supply voltage; a start-up switch coupled between an input voltage related signal and the controller supply voltage, wherein the input voltage related signal is related to an input voltage of the input power; and a power switch controller circuit coupled to the power stage circuit, wherein the power switch controller circuit is powered by the controller supply voltage and is configured to operably generate the switch control signal, and, wherein the power switch controller circuit is configured to operably control the start-up switch, the power switch controller circuit including: a multifunction pin, which is coupled to a control terminal of the start-up switch and which is configured to operably deliver different signals with different functions under at least two different modes, respectively; a start-up controller circuit, which is coupled to a control terminal of the start-up switch via the multifunction pin and which is configured to operably generate a start-up signal under a start-up mode, wherein the start-up signal is delivered to the control terminal of the start-up switch through the multifunction pin, so that when the controller supply voltage does not exceed a start-up voltage threshold, the start-up controller circuit controls the start-up switch to be ON, and when the controller supply voltage exceeds the start-up voltage threshold, the start-up controller circuit controls the start-up switch to be OFF; and a feedback compensation circuit, which includes an error amplifier circuit, wherein an output terminal of the feedback compensation circuit is coupled to the multifunction pin, the feedback compensation circuit being configured to operably generate a compensation signal at the multifunction pin under an operation mode, so that when the controller supply voltage exceeds the start-up voltage threshold, the power switch controller circuit generates the switch control signal according to the compensation signal.

In one embodiment, the switching regulator further comprises: a blocking diode coupled to the start-up switch, wherein the blocking diode is configured to operably block a backflow current and/or lower down a withstand voltage of the start-up switch.

In one embodiment, when the controller supply voltage exceeds the start-up voltage threshold, the feedback compensation circuit generates the compensation signal according to a feedback signal; wherein the feedback signal is related to the output power.

In one embodiment, the power switch controller circuit further includes an auxiliary sensing pin, and wherein the feedback compensation circuit is coupled to the auxiliary winding via the auxiliary sensing pin, so that the feedback compensation circuit receives the feedback signal from the auxiliary winding.

In one embodiment, the feedback compensation circuit further includes a sample-and-hold circuit, which is configured to, under a situation where the power switch is OFF, operably sample and hold the feedback signal, to generate a sample-and-hold signal; wherein the error amplifier circuit is configured to operably generate the compensation signal according to the sample-and-hold signal and a reference signal.

In one embodiment, the power switch controller circuit further includes a current sensing pin, and wherein the feedback compensation circuit is coupled to the power switch via the current sensing pin, so as to obtain the feedback signal according to a switch current flowing through the power switch.

In one embodiment, the input voltage related signal is directly coupled to the input voltage.

In one embodiment, the switching regulator further comprises: a rectifying circuit, which is configured to operably rectify an AC input signal to generate the input voltage, wherein the input voltage related signal is coupled to a positive-phase terminal or a negative-phase terminal of the AC input signal.

In one embodiment, the start-up controller circuit includes: a comparison circuit, which is configured to operably compare the controller supply voltage with a start-up reference voltage, to generate the start-up signal, wherein a level of the start-up reference voltage is related to the start-up voltage threshold; and a start-up control switch having a current input terminal and a current output terminal coupled between the controller supply voltage and the multifunction pin, wherein a control terminal of the start-up control switch is electrically connected to the start-up signal; wherein when the controller supply voltage does not exceed the start-up voltage threshold, the start-up control switch is controlled to be ON, thereby conducting the start-up switch; and wherein when the controller supply voltage exceeds the start-up voltage threshold, the start-up control switch is controlled to be OFF, thereby controlling the start-up switch to be OFF.

In one embodiment, the power switch controller circuit further includes a reset circuit coupled to the multifunction pin, and wherein after the controller supply voltage has been raised above the start-up voltage threshold, the reset circuit is configured to operably reset a multifunction pin voltage of the multifunction pin to a reset voltage during a reset stage.

In one embodiment, the reset circuit includes: a logic circuit, which is configured to operably generate a reset control signal according to a setting signal after the controller supply voltage has been raised above the start-up voltage threshold; a reset switch, which is coupled to the multifunction pin and the logic circuit, respectively, the reset switch being configured to operably reset the multifunction pin voltage to the reset voltage according to the reset control signal; and a determination circuit coupled to the logic circuit, wherein the determination circuit is configured to operably generate the setting signal according to the multifunction pin voltage and a reset voltage threshold; wherein after the controller supply voltage has been raised above the start-up voltage threshold and when the multifunction pin voltage is higher than the reset voltage threshold, the setting signal causes the reset control signal to turn ON the reset switch, thereby resetting the multifunction pin voltage to the reset voltage; wherein after the multifunction pin voltage drops to the reset voltage threshold, the setting signal causes the reset control signal to turn OFF the reset switch, thereby ceasing resetting the multifunction pin voltage to the reset voltage.

In one embodiment, the power switch controller circuit further includes a soft-start circuit coupled to the feedback compensation circuit; wherein after the start-up mode has completed, under the operation mode, the soft-start circuit is configured to operably execute a soft-start procedure, to limit an elevation speed of a multifunction pin voltage of the multifunction pin, thereby controlling an elevation speed of the output voltage.

In one embodiment, the power switch controller circuit further includes a switch control signal generation circuit coupled to the feedback compensation circuit; wherein the switch control signal generation circuit is configured to operably generate the switch control signal having characteristic of pulse width modulation (PWM), to control the power switch, thereby controlling the conduction status of the inductor.

From another perspective, the present invention provides a power switch controller circuit which is configured to operably control a switching regulator, the switching regulator including: a power stage circuit including an inductor and at least one power switch; wherein the least one power switch is coupled to the inductor, the power stage circuit being configured to operably operates according to a switch control signal, to control a conduction status of the inductor, thereby converting an input power to an output power; an auxiliary winding, wherein the auxiliary winding and the inductor together form a transformer, to generate a controller supply voltage; a start-up switch coupled between an input voltage related signal and the controller supply voltage, wherein the input voltage related signal is related to an input voltage of the input power; and a power switch controller circuit coupled to the power stage circuit, wherein the power switch controller circuit is powered by the controller supply voltage and is configured to operably generate the switch control signal, and, wherein the power switch controller circuit is configured to operably control the start-up switch, the power switch controller circuit comprising: a multifunction pin, which is coupled to a control terminal of the start-up switch and which is configured to operably deliver different signals with different functions under at least two different modes, respectively; a start-up controller circuit, which is coupled to a control terminal of the start-up switch via the multifunction pin and which is configured to operably generate a start-up signal under a start-up mode, wherein the start-up signal is delivered to the control terminal of the start-up switch through the multifunction pin, so that when the controller supply voltage does not exceed a start-up voltage threshold, the start-up controller circuit will control the start-up switch to be ON, and so that when the controller supply voltage exceeds the start-up voltage threshold, the start-up controller circuit will control the start-up switch to be OFF; and a feedback compensation circuit, which includes an error amplifier circuit, wherein an output terminal of the feedback compensation circuit is coupled to the multifunction pin, the feedback compensation circuit being configured to operably generate a compensation signal at the multifunction pin under an operation mode, so that when the controller supply voltage exceeds the start-up voltage threshold, the power switch controller circuit will generate the switch control signal according to the compensation signal.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
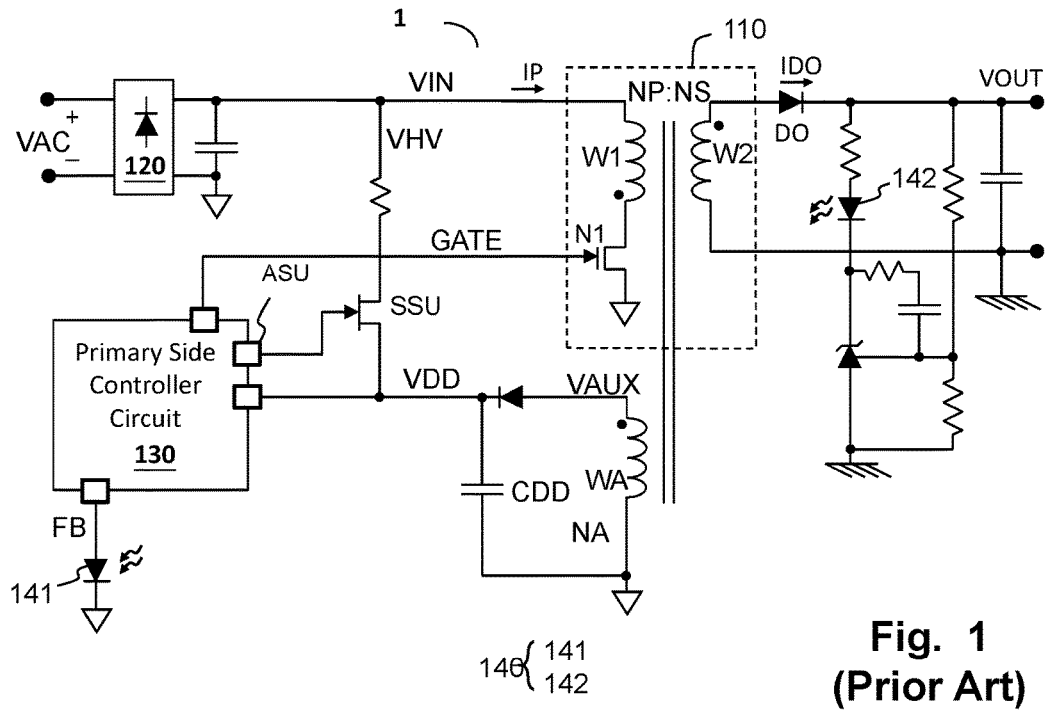
FIG. 1 shows a schematic diagram of a conventional switching regulator.
Figure 2A:
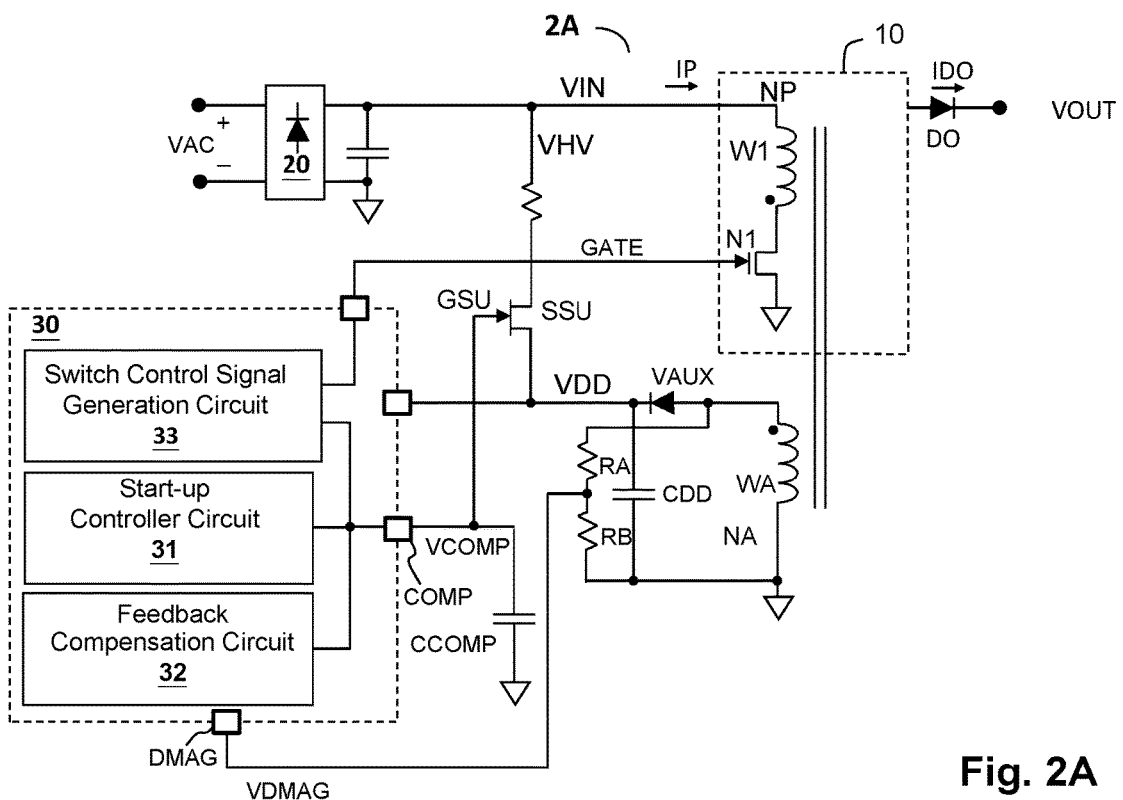
FIGS. 2A-2D show schematic diagrams of a switching regulator and a power switch controller circuit thereof according to several embodiments of the present invention.

Please refer to FIG. 2A, which shows a schematic diagram of a switching regulator (i.e., switching regulator 2A) and a power switch controller circuit thereof according to an embodiment of the present invention. The switching regulator 2A comprises: a power stage circuit 10, an auxiliary winding WA, a start-up switch SSU and a power switch controller circuit 30. The power stage circuit 10 can be a synchronous or asynchronous buck, boost, inverting, buck-boost, inverting-boost or flyback power stage circuit, as shown in FIGS. 3A-3K. The power stage circuit 10 includes an inductor W1 and at least one power switch N1. The power switch N1 is coupled to the inductor W1. The power switch N1 operates according to a switch control signal GATE, to control a conduction status of the inductor W1, thereby converting an input power to an output power. The inductor W1 can be a primary winding of a transformer and the transformer generates the output power through a secondary winding, if the power stage circuit 10 is a flyback power stage circuit. The input power includes an input voltage VIN and an input current (in this embodiment, the input current is substantially equal to the inductor current IP). The output power includes an output voltage VOUT and an output current. The switching regulator 2A can regulate the output voltage VOUT or the output current to a predetermined level, depending upon application requirements. In this embodiment, the inductor W1 receives the input voltage VIN; however, in some other types of power stage circuits as shown in FIGS. 3A-3K, the input voltage VIN can be received via the inductor W1 or the power switch N1. The auxiliary winding WA and the inductor W1 form a transformer, to generate an auxiliary voltage VAUX, thereby providing a controller supply voltage VDD. The controller supply voltage VDD is related to the auxiliary voltage VAUX. In one embodiment, the controller supply voltage VDD can be generated by, for example but not limited to, rectifying, filtering and/or regulating the auxiliary voltage VAUX. The power switch N1 is coupled to the inductor W1. The power switch N1 and the inductor W1 can be coupled to each other in series as shown in FIG. 2A.

In one embodiment, for example, the power switch controller circuit 30 can be, for example but not limited to, an integrated circuit (IC) chip. In one embodiment, the power switch controller circuit 30 includes a multifunction pin COMP, a power pin (which is a pin coupled to the controller supply voltage VDD), an auxiliary sensing pin DMAG and a switch control pin (which is a pin to provide the switch control signal GATE to a control terminal of the power switch N1). The respective functions for the pins will be described later. The power switch controller circuit 30 is coupled to the power stage circuit 10. The power switch controller circuit 30 is powered by the controller supply voltage VDD and is configured to operably generate the switch control signal GATE. The generated switch control signal GATE controls the power switch N1, so as to control the conduction status of the inductor W1. In one embodiment, under an operation mode, a switch control signal generation circuit 33 of the power switch controller circuit 30 receives a compensation signal VCOMP via the multi-function pin COMP, and generates the switch control signal GATE in a form of, for example but not limited to, pulse width modulation (PWM), to control the power switch N1 according to the compensation signal VCOMP. In one embodiment, under an operation mode, the switching regulator 2A obtains a divided voltage of the auxiliary voltage VAUX by, for example but not limited to, voltage divider resistors RA and RB, and the obtained divided voltage of the auxiliary voltage VAUX is the auxiliary sensing signal VDMAG which is received via the auxiliary sensing pin DMAG by the power switch controller circuit 30, to obtain information related to the output voltage VOUT (output voltage related information), for feedback control. Under such circumstance, the auxiliary sensing signal VDMAG can be regarded as a feedback signal. In this embodiment, the feedback signal is related to the output voltage VOUT. In another embodiment, the power switch controller circuit 30 can adopt an output current related signal as a feedback signal for controlling the power switch N1. Under such circumstance, the output current related signal can be, for example but not limited to, a signal related to an inductor current IP flowing through the inductor W1 or a current flowing through the power switch N1.

Figure 2B:
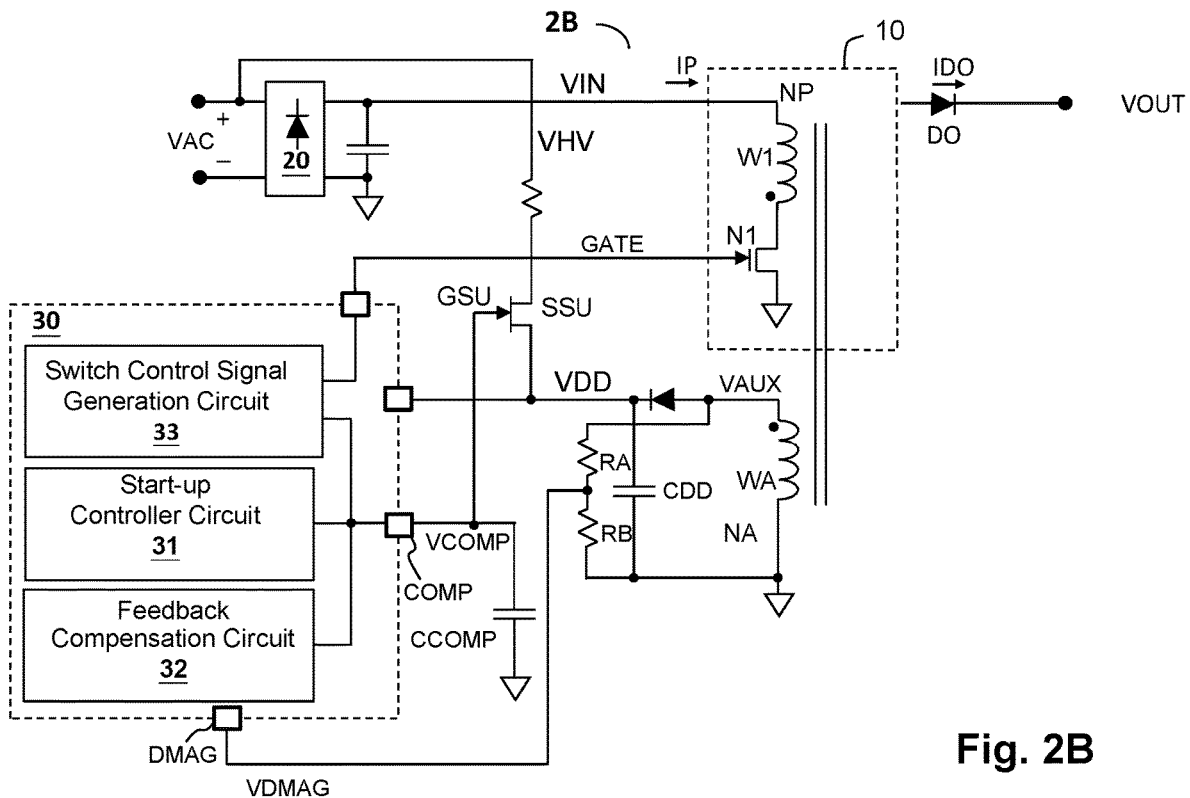
Figure 2C:
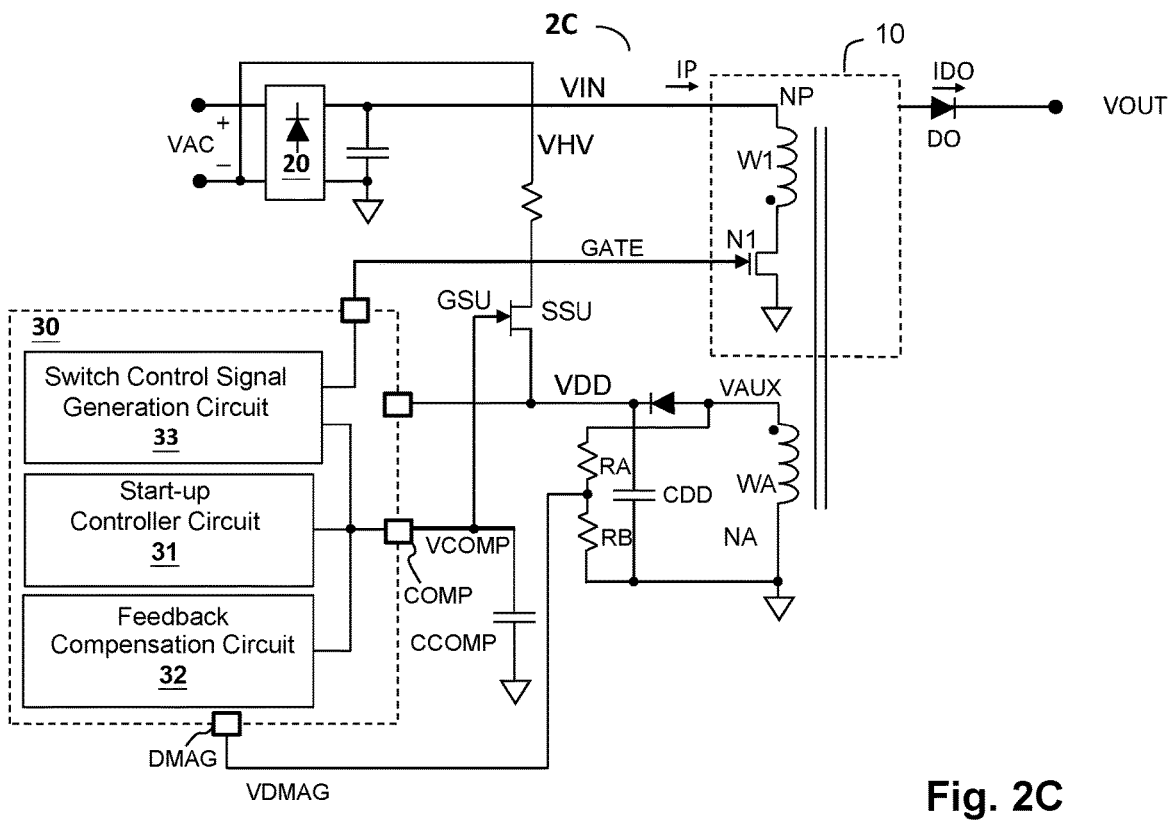
Figure 2D:
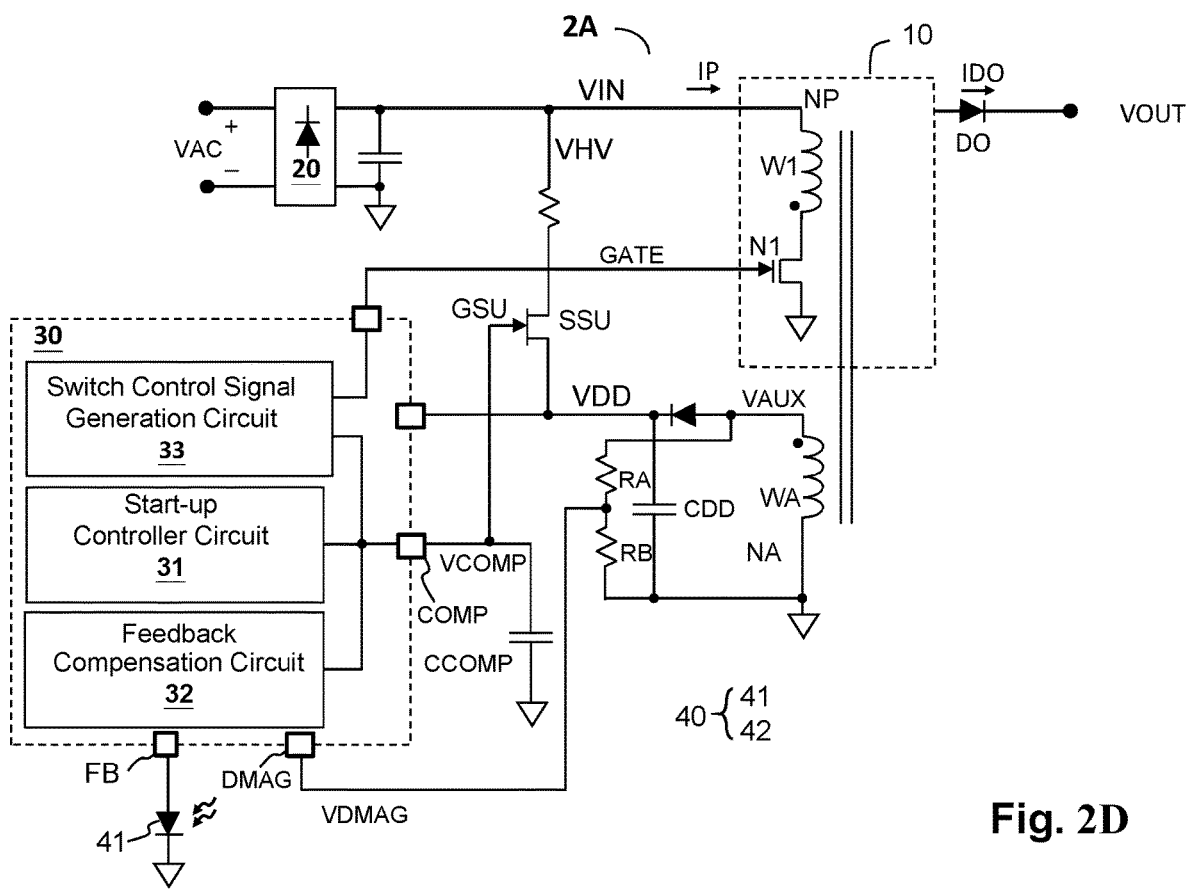
Figure 3A:
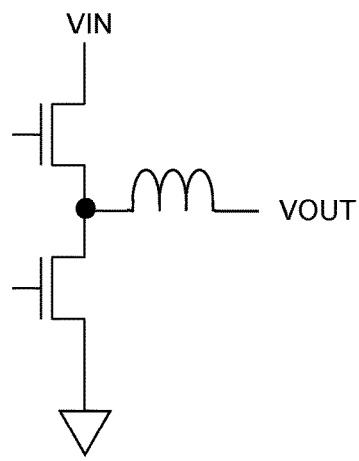
FIGS. 3A-3K show synchronous and asynchronous buck, boost, inverting, buck-boost, inverting-boost and flyback power stage circuits, respectively.
Figure 3B:
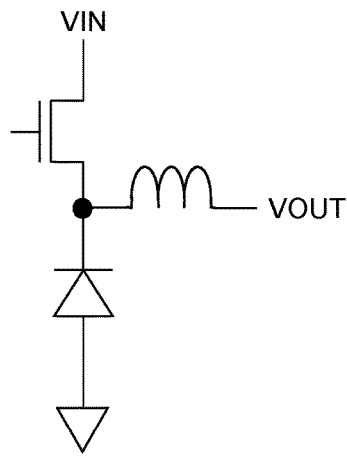
Figure 3C:
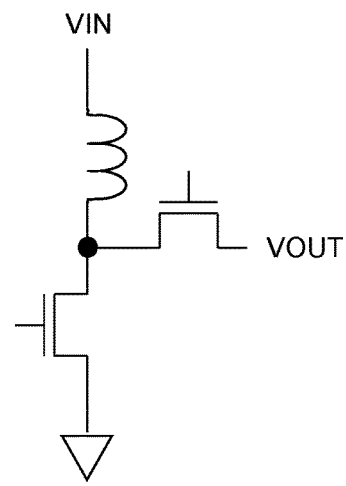
Figure 3D:
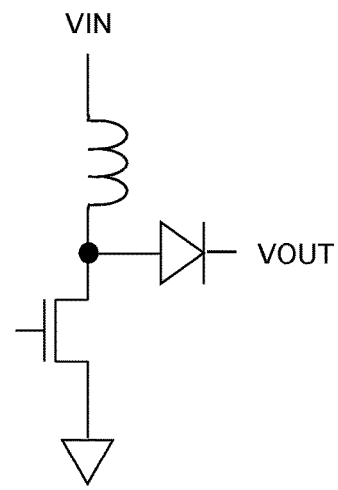
Figure 3E:
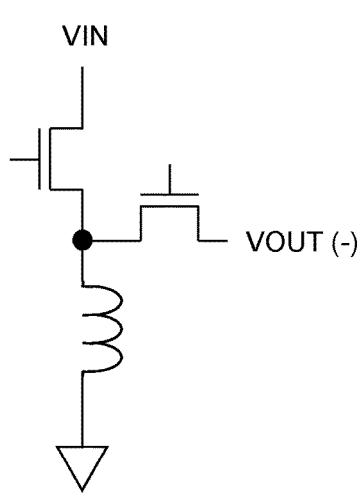
Figure 3F:
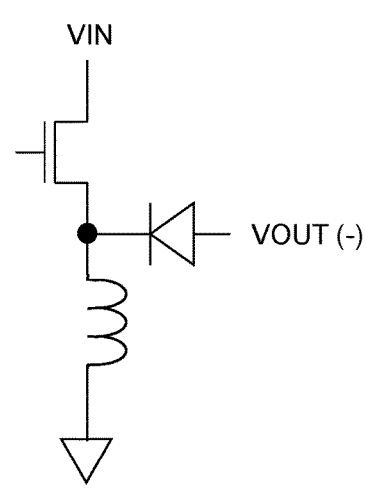
Figure 3G:
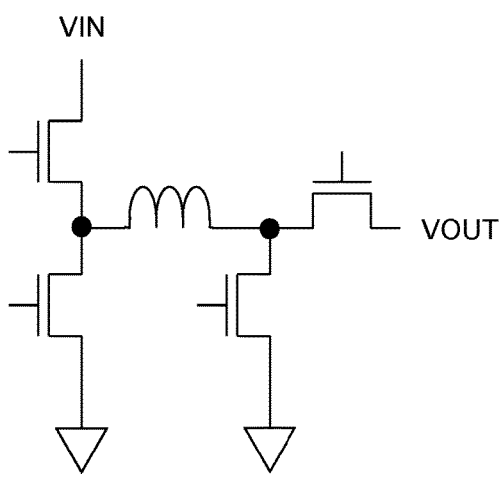
Figure 3H:
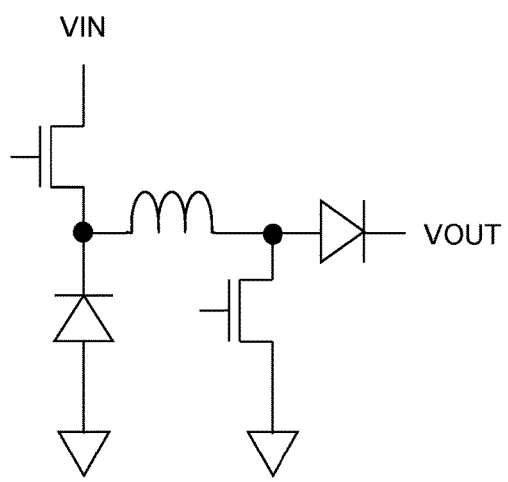
Figure 3I:
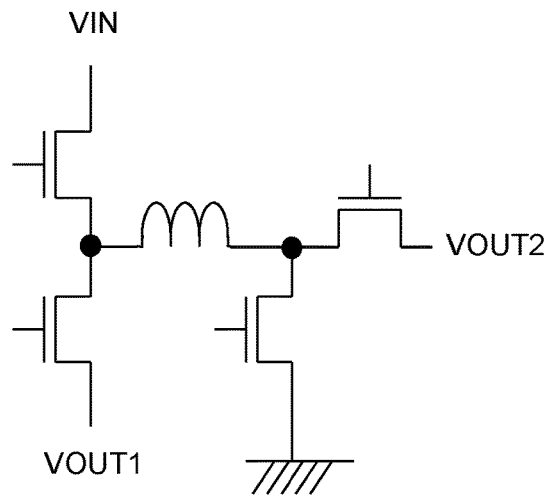
Figure 3J:
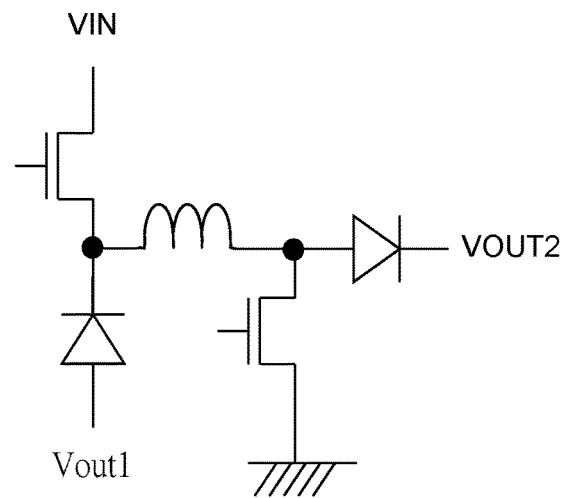
Figure 3K:
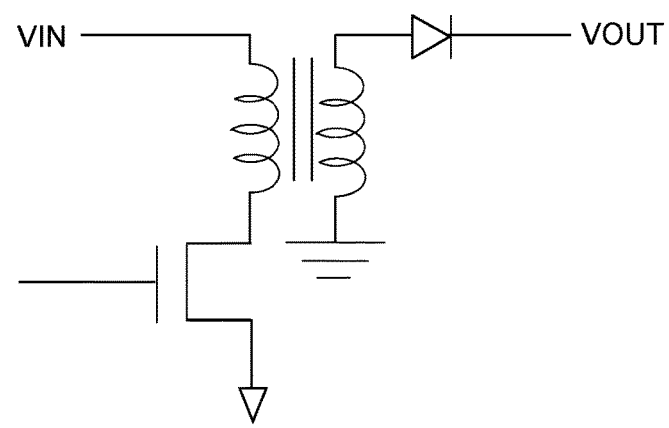
Figure 13A:
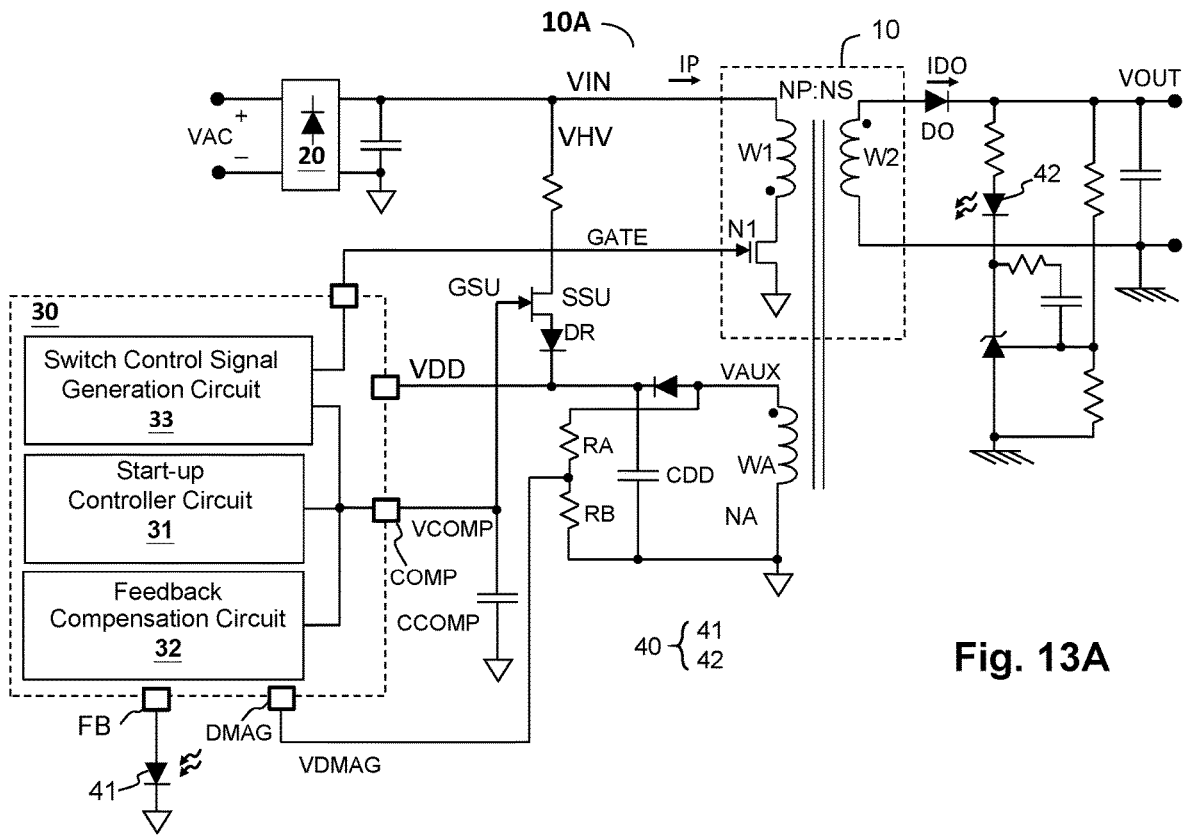
FIGS. 13A-13C show schematic diagrams of a switching regulator and a power switch controller circuit thereof according to still another several embodiments of the present invention.
Figure 13B:
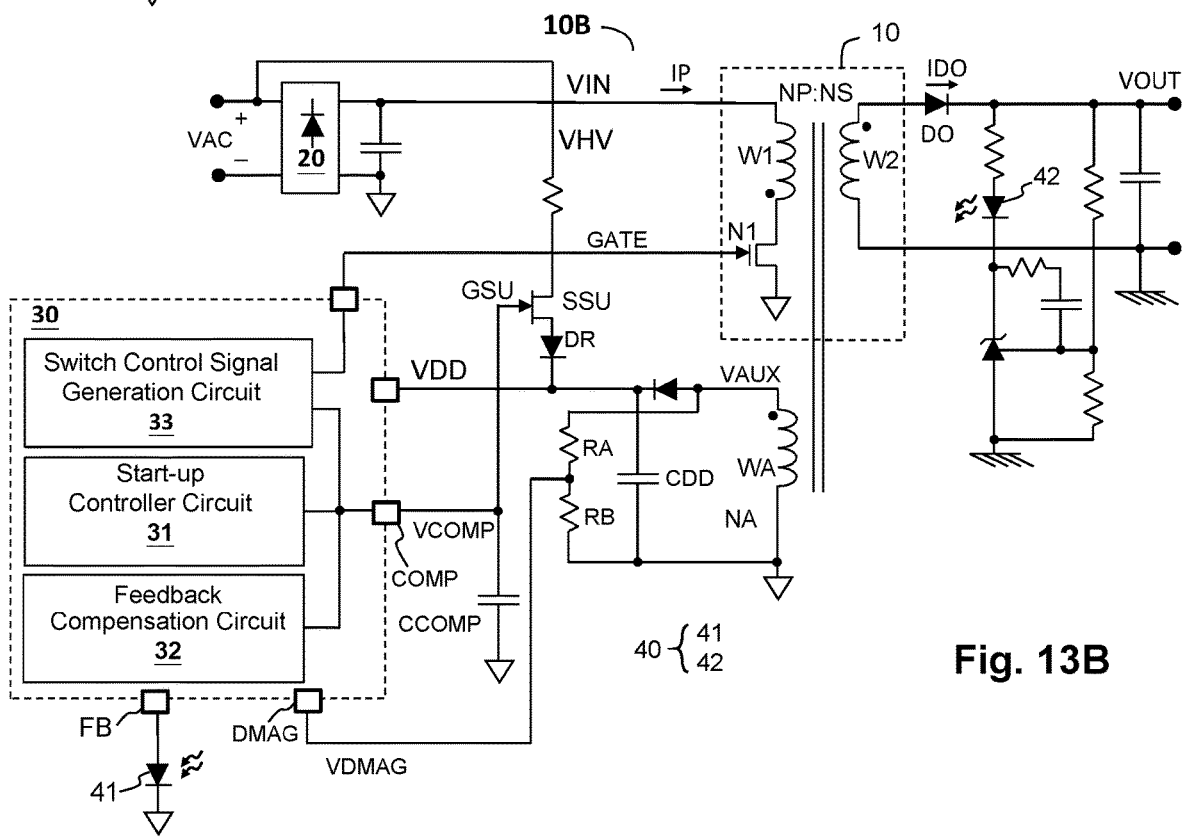
Figure 13C:
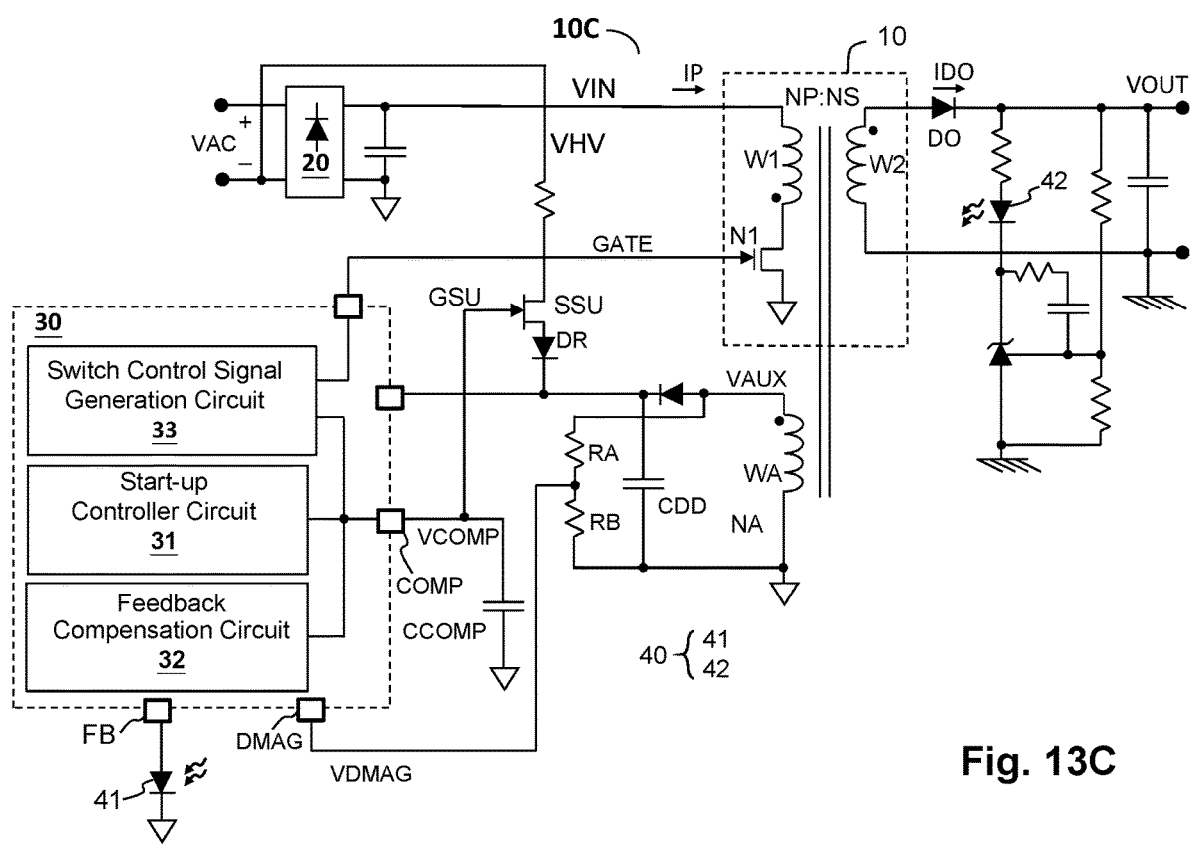

Please still refer to FIG. 2A. In one embodiment, the start-up switch SSU has a current input terminal coupled to an input voltage related signal VHV and has a current output terminal coupled to the controller supply voltage VDD, wherein the input voltage related signal VHV is related to the input voltage VIN. In one embodiment, as shown in FIG. 2A, the input voltage related signal VHV is electrically directly connected to the input voltage VIN. Please refer to both FIG. 2B and FIG. 2C. As shown in FIG. 2B and FIG. 2C, in one embodiment, the switching regulator (i.e., switching regulator 2B or a switching regulator 2C) further comprises a rectifying circuit 20, which is configured to operably rectify an AC input signal VAC, to generate the input voltage VIN. The input voltage related signal VHV is coupled to a positive-phase terminal (as shown in FIG. 2B) of the AC input signal VAC or a negative-phase terminal (as shown in FIG. 2C) of the AC input signal VAC. In one embodiment, the start-up switch SSU can be, for example but not limited to, a JFET transistor. In one embodiment, a blocking diode (such as the diode DR in FIGS. 13A-13C) can be coupled in series between the current output terminal of the start-up switch SSU and the controller supply voltage VDD. The blocking diode DR is configured to block a backflow current which flows back from the controller supply voltage VDD to the input voltage related signal VHV. In another embodiment, the blocking diode also provides a function to lower down a withstand voltage (for example when the blocking diode is reverse biased) of the start-up switch SSU, so that a start-up switch SSU having a relatively lower withstand voltage can be used to reduce the manufacturing cost.

Please still refer to FIG. 2A. In one embodiment, the power switch controller circuit 30 includes a multifunction pin COMP, a start-up controller circuit 31, a feedback compensation circuit and a switch control signal generation circuit 33. The multifunction pin COMP is coupled to a control terminal GSU of the start-up switch SSU and is configured to operably deliver different signals with different functions under at least two different modes, respectively. According to the present invention, the multifunction pin COMP can, for example under a start-up mode, deliver a start-up signal to the control terminal GSU of the start-up switch SSU, so as to rapidly raise a level of the controller supply voltage VDD to complete start-up stage, and under an operation mode, the multifunction pin COMP can deliver a compensation signal VCOMP to the switch control signal generation circuit 33 of the power switch controller circuit 30, for generating the switch control signal GATE to control the power switch N1, thereby controlling the conduction status of the inductor W1.

The start-up controller circuit 31 is coupled to the control terminal GSU of the start-up switch SSU via the multifunction pin COMP. When the controller supply voltage VDD is lower than a start-up voltage threshold VTH (i.e., under a situation where the controller supply voltage VDD has not yet reached a level required for normal operation voltage of the power switch controller circuit 30), the start-up controller circuit 31 controls the start-up switch SSU to be ON, so that the input voltage VIN directly charges a supply capacitor CDD to rapidly raise a level of the controller supply voltage VDD, to complete the start-up stage. On the other hand, when the controller supply voltage VDD is higher than a start-up voltage threshold VTH (i.e., under a situation where the controller supply voltage VDD has already reached a level required for normal operation voltage of the power switch controller circuit 30), the start-up controller circuit 31 controls the start-up switch SSU to be OFF, thereby ending the start-up stage.

In brief, the multifunction pin COMP, in addition to being useful in the start-up mode, can also provide a useful function under at least another one mode such as the operation mode. In this embodiment, the feedback compensation circuit 32 is configured to operably generate a compensation signal VCOMP at the multifunction pin COMP under the operation mode. An output terminal of an error amplifier circuit (not shown but will be described later) in the feedback compensation circuit 32 is coupled to the multifunction pin COMP. This error amplifier circuit is configured to operably generate a compensation signal VCOMP at the multifunction pin COMP under the operation mode, so that when the controller supply voltage VDD exceeds the start-up voltage threshold VTH, the power switch controller circuit 30 will generate the switch control signal GATE according to the compensation signal VCOMP.

According to the present invention, in one embodiment, when the controller supply voltage VDD is higher than a start-up voltage threshold VTH, the switch control signal generation circuit 33 can, according to the compensation signal VCOMP, control the switching regulator 2A to convert the input voltage VIN to the output voltage VOUT through controlling the power switch N1. The details as to how this control mechanism operates will be described in the following embodiments.

Figure 4A:
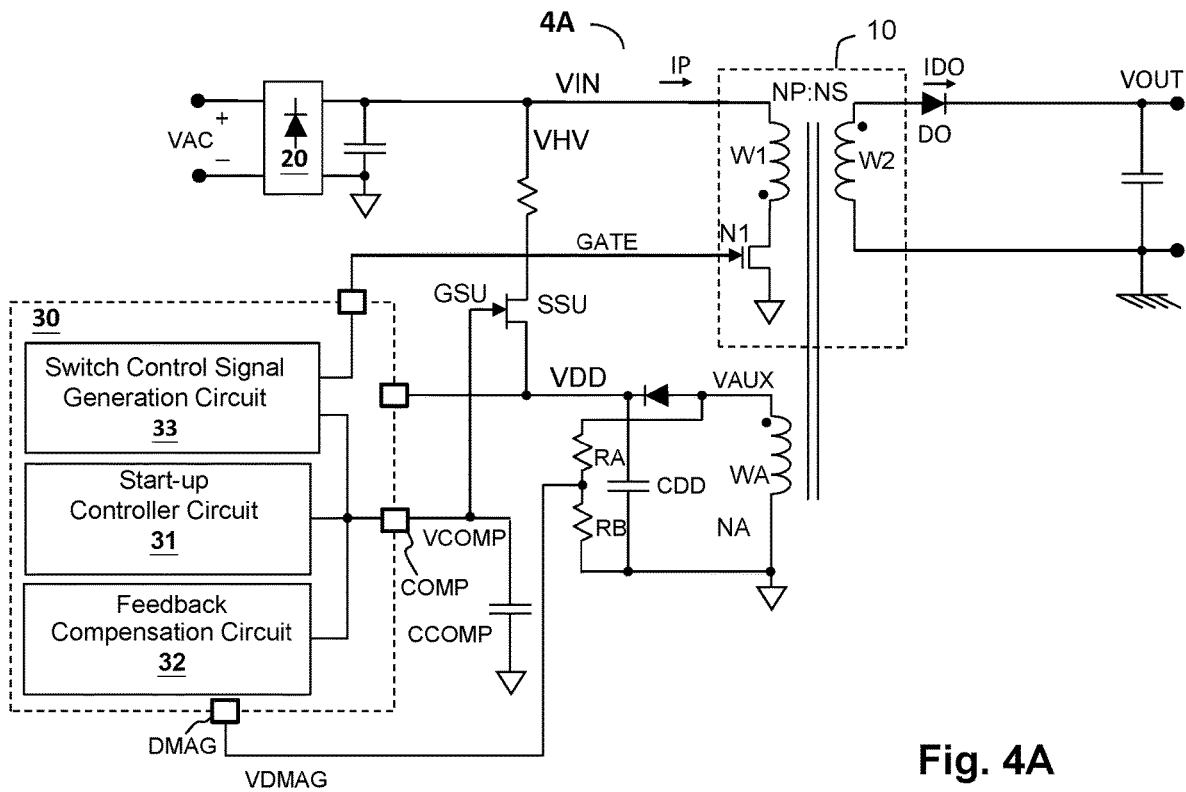
FIGS. 4A-4B show schematic diagrams of a switching regulator and a power switch controller circuit thereof according to two other embodiments of the present invention.

Please refer to FIG. 4A, which shows a schematic diagram of a switching regulator (i.e., switching regulator 4A) and a power switch controller circuit thereof according to another embodiment of the present invention. The switching regulator 4A comprises: a power stage circuit 10, an auxiliary winding WA, a start-up switch SSU and a power switch controller circuit 30. The power stage circuit 10 can include, for example but not limited to, a transformer (which includes inductors W1 and W2) as shown in FIG. 4A and at least one power switch N1. The power switch N1 is coupled to the inductor W1. The power switch N1 operates according to a switch control signal GATE, to control a conduction status of the inductor W1, thereby converting an input power (which includes an input voltage VIN) to an output power (which includes an output voltage VOUT). In this embodiment, the inductor W1 for example can be configured to operably receive the input voltage VIN. A secondary winding is configured to operably generate the output voltage VOUT. The auxiliary winding WA and the inductor W1 form a transformer, to generate an auxiliary voltage VAUX, thereby providing a controller supply voltage VDD. The controller supply voltage VDD is related to the auxiliary voltage VAUX. In one embodiment, the controller supply voltage VDD can be generated by, for example but not limited to, rectifying, filtering and/or regulating the auxiliary voltage VAUX. The power switch N1 is coupled to the inductor W1.

Figure 4B:
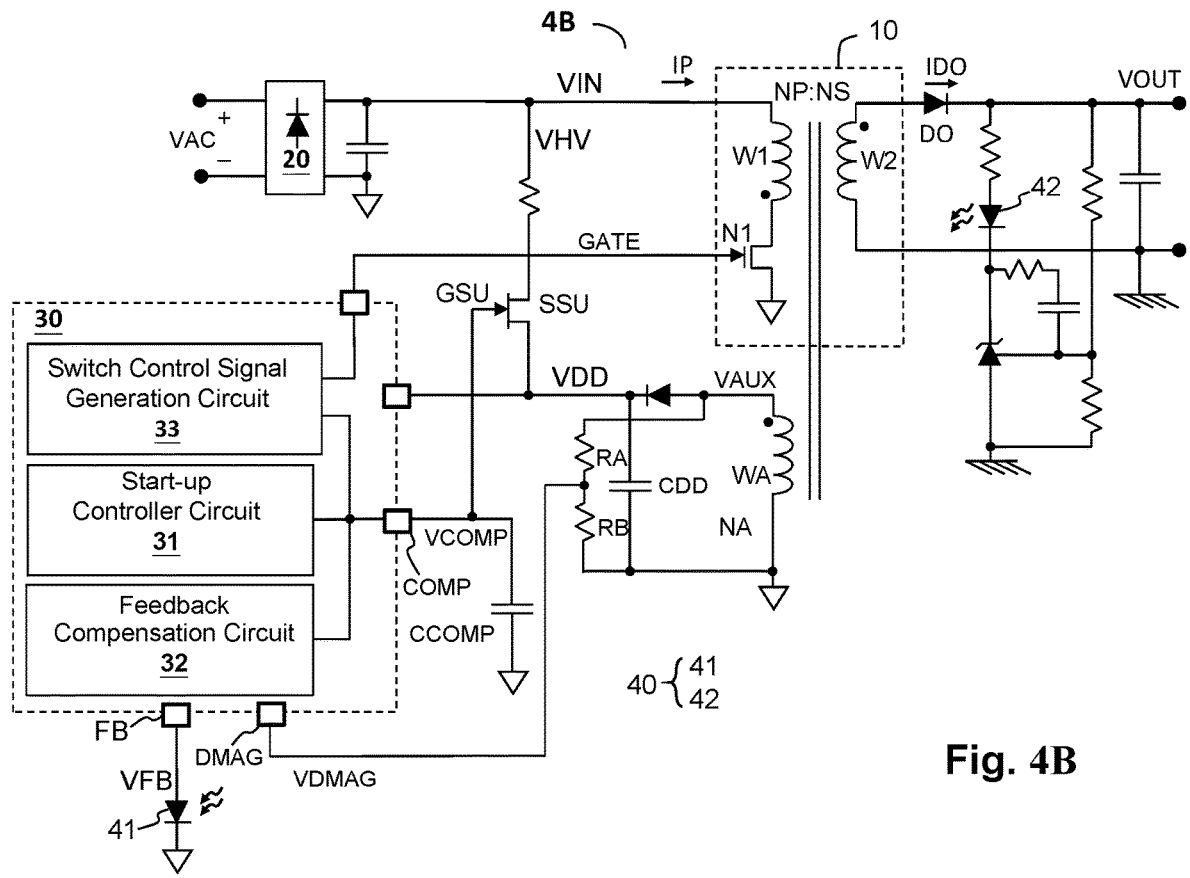

In one embodiment, for example, the power switch controller circuit 30 can be, for example but not limited to, an integrated circuit (IC) chip. In one embodiment, as shown in FIG. 4A, the power switch controller circuit 30 includes a multifunction pin COMP, a power pin (which is a pin coupled to the controller supply voltage VDD), an auxiliary sensing pin DMAG and a switch control pin (which is a pin to provide the switch control signal GATE to a control terminal of the power switch N1). The respective functions for the pins will be described later. The power switch controller circuit 30 is at a primary side of the power stage circuit 10 and is powered by the controller supply voltage VDD. The power switch controller circuit 30 is configured to operably generate the switch control signal GATE for controlling the power switch N1, so as to control the conduction status of the inductor W1. In one embodiment, under an operation mode, a switch control signal generation circuit 33 of the power switch controller circuit 30 receives a compensation signal VCOMP via the multifunction pin COMP, and generates the switch control signal GATE in a form of, for example but not limited to, pulse width modulation (PWM), to control the power switch N1 according to the compensation signal VCOMP. In one embodiment, under an operation mode, the switching regulator 4A obtains a feedback signal from the primary side of the power switch controller circuit 30; for example, the switching regulator 4A obtains a divided voltage of the auxiliary voltage VAUX by voltage divider resistors RA and RB, and the obtained divided voltage of the auxiliary voltage VAUX is the auxiliary sensing signal VDMAG which is received via the auxiliary sensing pin DMAG by the power switch controller circuit 30, to obtain information related to the output voltage VOUT (output voltage related information), for feedback control. Under such circumstance, the auxiliary sensing signal VDMAG can be regarded as a feedback signal. In one embodiment, the power switch controller circuit 30 further obtains a current related signal as a feedback signal for controlling the power switch N1, wherein the current related signal can be, for example but not limited to, a signal related to an inductor current IP flowing through the inductor W1, a current flowing through the power switch N1 or a secondary side diode current IDO flowing through the secondary side winding W2. In one embodiment, as shown in FIG. 4B, the power switch controller circuit 30 of the switching regulator 4B can obtain output voltage related information from the secondary side of the power stage circuit 10 via for example a feedback pin FB and a coupling device 40 (including a receiving unit 41 and an emission unit 42); the obtained output voltage related information is taken as a feedback signal VFB for feedback control.

Please still refer to FIG. 4A. In one embodiment, the start-up switch SSU has a current input terminal coupled to an input voltage related signal VHV and has a current output terminal coupled to the controller supply voltage VDD. The input voltage related signal VHV is related to the input voltage VIN. In one embodiment, as shown in FIGS. 4A and 4B, the input voltage related signal VHV is electrically directly connected to the input voltage VIN. In one embodiment, the start-up switch SSU can be, for example but not limited to, a JFET transistor.

Please still refer to FIG. 4A. In one embodiment, the power switch controller circuit 30 includes a multifunction pin COMP, a start-up controller circuit 31, a feedback compensation circuit and a switch control signal generation circuit 33. The multifunction pin COMP is coupled to a control terminal GSU of the start-up switch SSU and is configured to operably deliver different signals with different functions under at least two different modes, respectively. According to the present invention, the multifunction pin COMP can, for example under a start-up mode, deliver a start-up signal to the control terminal GSU of the start-up switch SSU, so as to rapidly raise a level of the controller supply voltage VDD to complete the start-up stage. Under an operation mode, the multifunction pin COMP can deliver a compensation signal VCOMP to the switch control signal generation circuit 33 of the power switch controller circuit 30, for generating the switch control signal GATE to control the power switch N1, thereby controlling the conduction status of the inductor W1.

The start-up controller circuit 31 is coupled to the control terminal GSU of the start-up switch SSU via the multifunction pin COMP. When the controller supply voltage VDD is lower than a start-up voltage threshold VTH (i.e., under a situation where the controller supply voltage VDD has not yet reached a level required for normal operation voltage of the power switch controller circuit 30), the start-up controller circuit 31 controls the start-up switch SSU to be ON, so that the input voltage VIN directly charges a supply capacitor CDD to rapidly raise a level of the controller supply voltage VDD, to complete the start-up stage. On the other hand, when the controller supply voltage VDD is higher than a start-up voltage threshold VTH (i.e., under a situation where the controller supply voltage VDD has already reached a level required for normal operation voltage of the power switch controller circuit 30), the start-up controller circuit 31 controls the start-up switch SSU to be OFF, thereby ending the start-up stage.

In brief, the multifunction pin COMP, in addition to being useful in the start-up mode, can also provide a useful function under at least another one mode such as the operation mode. In this embodiment, the feedback compensation circuit 32 is configured to operably generate a compensation signal VCOMP at the multifunction pin COMP under the operation mode. An output terminal of an error amplifier circuit (not shown but will be described later) in the feedback compensation circuit 32 is coupled to the multifunction pin COMP. This error amplifier circuit is configured to operably generate a compensation signal VCOMP at the multifunction pin COMP under the operation mode, so that when the controller supply voltage VDD exceeds the start-up voltage threshold VTH, the power switch controller circuit 30 will generate the switch control signal GATE according to the compensation signal VCOMP. According to the present invention, in one embodiment, when the controller supply voltage VDD is higher than a start-up voltage threshold VTH, the switch control signal generation circuit 33 can, according to the compensation signal VCOMP, control the switching regulator 4A to convert the input voltage VIN to the output voltage VOUT through controlling the power switch N1. The details as to how this control mechanism operates will be described in the following embodiments.

Figure 5:
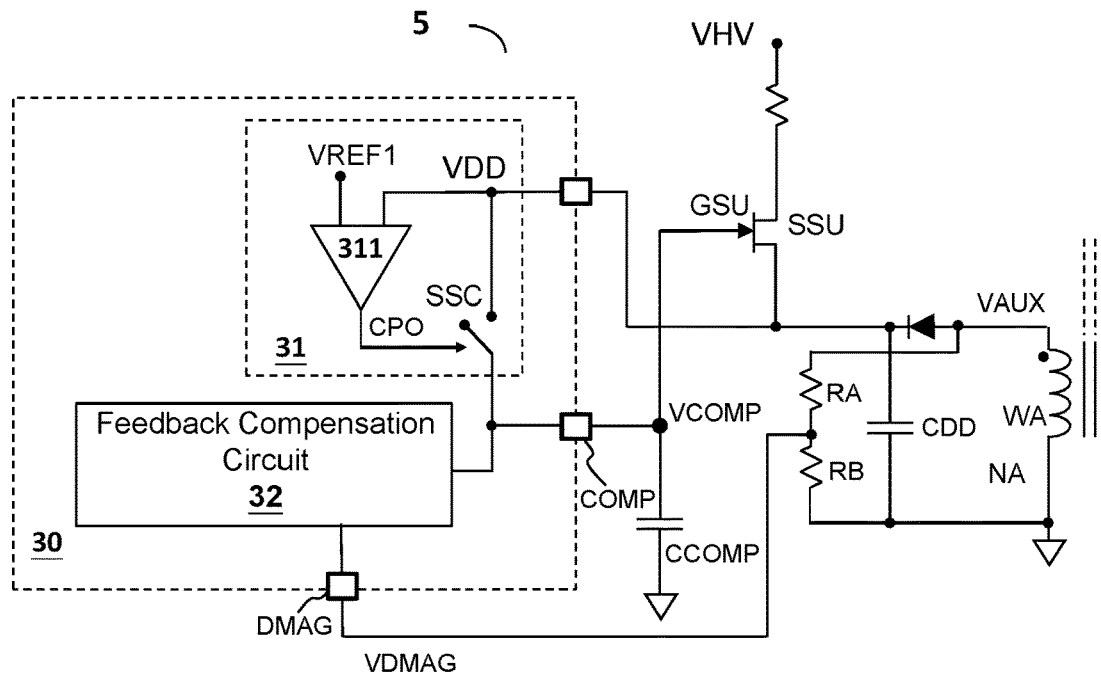
FIG. 5 shows a schematic diagram of a switching regulator and a start-up controller circuit thereof according to an embodiment of the present invention.

Please refer to FIG. 5, which shows a schematic diagram of a switching regulator 5 and a start-up controller circuit (i.e., start-up controller circuit 31) thereof according to an embodiment of the present invention. The start-up controller circuit 31 includes a comparison circuit 311 and a start-up control switch SSC. The comparison circuit 311 is configured to operably compare the controller supply voltage VDD with a start-up reference voltage VREF1, to generate a comparison output signal CPO, wherein the start-up reference voltage VREF1 has a level which is related to the start-up voltage threshold VTH. In one embodiment, the level of the start-up reference voltage VREF1 can be equal to the start-up voltage threshold VTH or there is a predetermined ratio between the level of the start-up reference voltage VREF1 and the start-up voltage threshold VTH. The start-up control switch SSC has a current input terminal and a current output terminal which are coupled between the controller supply voltage VDD and the multifunction pin COMP (i.e., between the current input terminal and the control terminal of the start-up switch SSU), and the start-up control switch SSC has a control terminal which is electrically connected to the comparison output signal CPO. When the controller supply voltage VDD is lower than the start-up voltage threshold VTH, a start-up mode is entered and the start-up control switch SSC is controlled to be ON. The controller supply voltage VDD functions as a start-up signal, which is delivered to the control terminal GSU of the start-up switch SSU via the multifunction pin COMP. As a consequence, when the controller supply voltage VDD is lower than a start-up voltage threshold VTH, the start-up switch SSU is controlled to be ON, whereby the input voltage related signal VHV (which is for example the input voltage VIN) directly charges a supply capacitor CDD to rapidly raise the level of the controller supply voltage VDD, thereby completing the start-up stage. On the other hand, when the controller supply voltage VDD is higher than the start-up voltage threshold VTH, the start-up control switch SSC is controlled to be OFF, so that the start-up switch SSU is controlled to be OFF, thereby ending the start-up stage. In this embodiment, the start-up switch SSU can be, for example but not limited to, a JFET transistor or a depletion transistor, which typically has a negative conduction threshold voltage. According to the present invention, the start-up switch SSU can be turned ON by turning ON the start-up control switch SSC (i.e., causing a short-circuit connection between the current input terminal and the control terminal of the start-up switch SSU).

Figure 6:
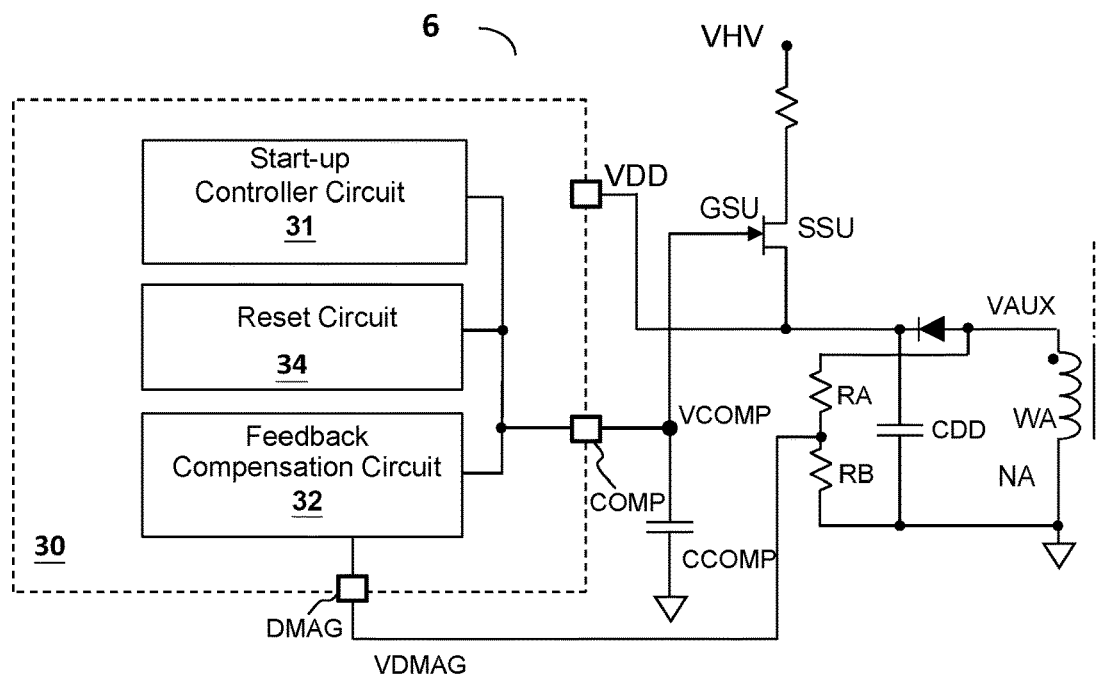
FIG. 6 shows a schematic diagram of a switching regulator and a power switch controller circuit thereof according to yet another embodiment of the present invention.

Please refer to FIG. 6, which shows a schematic diagram of a switching regulator 6 and a power switch controller circuit 30 thereof according to yet another embodiment of the present invention. As shown in FIG. 6, according to the present invention, the power switch controller circuit 30 further includes a reset circuit 34 coupled to the multifunction pin COMP. The reset circuit 34 is configured to, after the controller supply voltage VDD has been raised above the start-up voltage threshold VTH, operably reset a multifunction pin voltage (i.e., the compensation signal VCOMP) of the multifunction pin COMP to a reset voltage. Under the start-up mode, the multifunction pin COMP is coupled between the input voltage related signal VHV (e.g., the input voltage VIN) and the controller supply voltage VDD to rapidly raise the level of the controller supply voltage VDD to complete the start-up stage; however, this also causes a compensation capacitor CCOMP which is electrically connected to the multifunction pin COMP to be charged, and the multifunction pin voltage of the multifunction pin COMP is accordingly raised. When the controller supply voltage VDD is higher than the start-up voltage threshold VTH, the start-up stage of the start-up mode ends, and the start-up switch SSU coupled between the input voltage related signal VHV (e.g., the input voltage VIN) and the controller supply voltage VDD is OFF. However, under such situation, the compensation capacitor CCOMP has already been charged, and the multifunction pin voltage of the multifunction pin COMP has been raised to a certain level. To ensure that the multifunction pin COMP can normally operate under the operation mode after the start-up mode has finished it is required to discharge the compensation capacitor CCOMP before the operation mode starts, and this is the reset stage. In one embodiment of the present invention, the compensation capacitor CCOMP can be discharged via the multifunction pin COMP through the reset circuit 34, so as to reset the multifunction pin voltage of the multifunction pin COMP to a reset voltage. The reset voltage can be for example a ground voltage or any other suitable voltage level.

Figure 7:
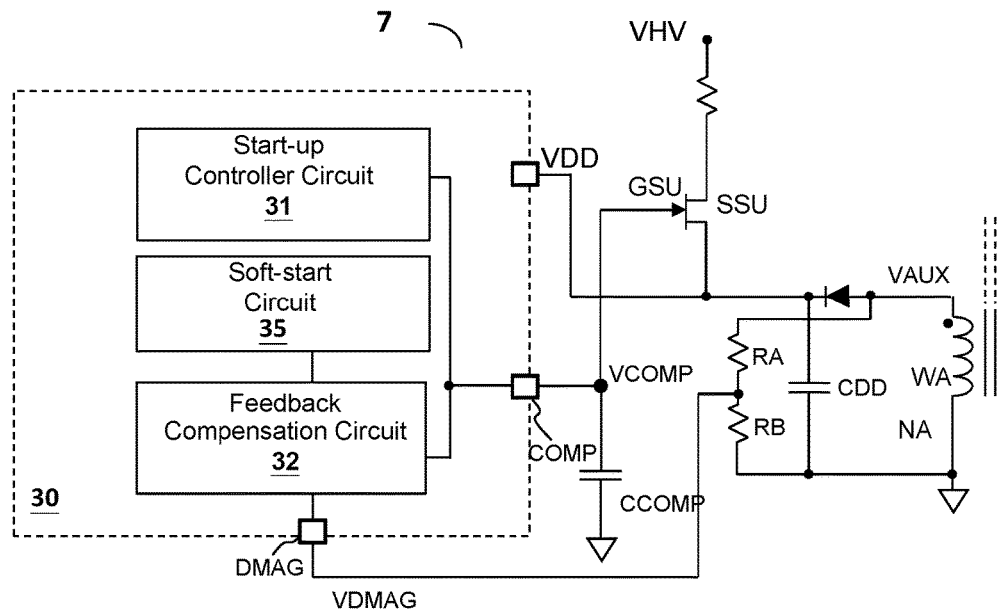
FIG. 7 shows a schematic diagram of a switching regulator and a power switch controller circuit thereof according to still another embodiment of the present invention.

Please refer to FIG. 7, which shows a schematic diagram of a switching regulator 7 and a power switch controller circuit 30 thereof according to still another embodiment of the present invention. As shown in FIG. 7, according to the present invention, the power switch controller circuit 30 further includes a soft-start circuit 35 coupled to the feedback compensation circuit 32. After the start-up stage has finished, at the beginning (which is a soft-start stage) of the operation mode, the soft-start circuit 35 is configured to operably execute a soft-start procedure, to limit an elevation speed of a multifunction pin voltage (i.e., the compensation signal VCOMP) at the multifunction pin COMP and an elevation speed of the output voltage VOUT. The soft-start procedure is preferred for the reason that, when there is a large difference between the target value and a subject signal such as the output voltage VOUT to be regulated at the output terminal, at the beginning of feedback control, an undesirable inrush current may be generated due to such a large difference, and an undesirable large fluctuation will occur on the output voltage VOUT, so that it will take a relatively longer time to reach the target value at a stable state. To overcome such a drawback, the above-mentioned fluctuation on the output voltage VOUT can be mitigated by controlling the elevation speed of the compensation signal VCOMP. In addition, when an undesirable inrush current is generated, the power switch controller circuit 30 typically will execute an over current protection (OCP) procedure. However, in executing the over current protection (OCP) procedure, undesirably, the switching regulator sometimes dose not start-up (e.g., the switching regulator may enter a latched-up state). The soft-start circuit 35 on the one hand can shorten the time required for the output signal to reach the target value at a stable state, on the other hand can prevent the above-mentioned over current protection (OCP) procedure from being triggered at an improper occasion. The soft-start circuit 35 can be implemented in various ways which are well known to those skilled in the art and is therefore not redundantly explained here.

Figure 8:
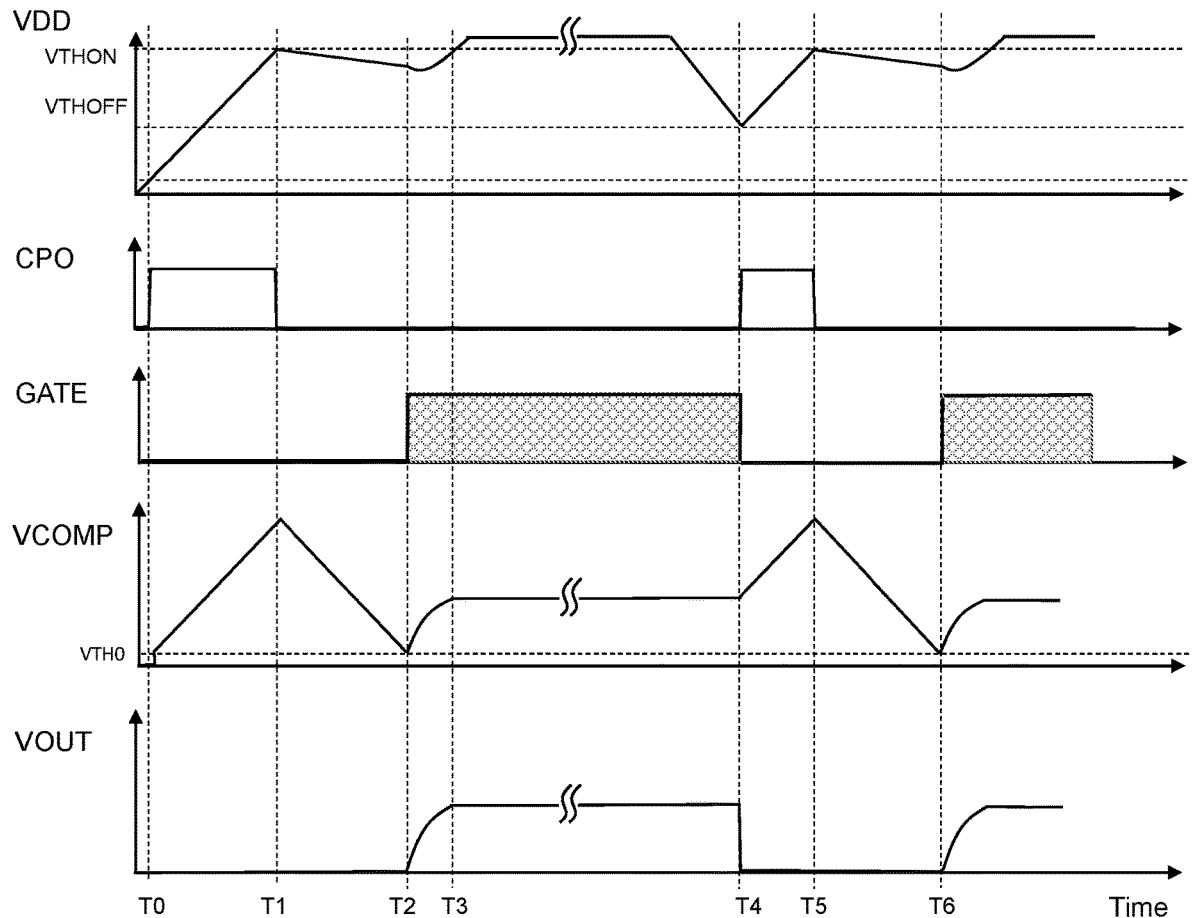
FIG. 8 shows waveforms corresponding to a switching regulator of the present invention.

Please refer to FIG. 8, which shows waveforms corresponding to a switching regulator of the present invention. As shown in FIG. 8, during a start-up stage (e.g., from time point T0 to T1), when the controller supply voltage VDD is lower than a start-up voltage threshold VTH (i.e., the VTHON shown in FIG. 8), the start-up control switch SSC is controlled to be ON (the comparison output signal CPO is at a high level), so that the start-up switch SSU is controlled to be ON. Under such situation, the multifunction pin voltage (i.e., the compensation signal VCOMP) of the multifunction pin COMP is raised as the controller supply voltage VDD is raised. When the controller supply voltage VDD reaches the start-up voltage threshold VTH (i.e., the time point T1 shown in FIG. 8), the start-up control switch SSC is turned OFF (the comparison output signal CPO is at a low level), so that the start-up switch SSU is turned OFF, thereby ending the start-up stage.

After a start-up stage of the start-up mode has ended, according to the present invention, the switching regulator will enter in for example a reset stage (e.g., time point T1 to T2), during which the compensation capacitor CCOMP can be discharged via the multifunction pin COMP through the reset circuit 34, so as to reset the multifunction pin voltage (i.e., the compensation signal VCOMP) of the multifunction pin COMP to the reset voltage VTH0. As shown in FIG. 8, the reset voltage VTH0 corresponds to a level of the compensation signal VCOMP at time point T2.

After the reset stage has ended, according to the present invention, the switching regulator will enter in for example a soft-start stage (e.g., time point T2 to T3). During the soft-start stage, the soft-start circuit 35 can, for example but not limited to, gradually increase a level of the compensation signal VCOMP and thus gradually increase the output voltage VOUT (or the output current), as shown by the waveforms of the compensation signal VCOMP and the output voltage VOUT from time point T2 to T3 in FIG. 8.

After the soft-start stage has ended, as shown from time point T3 to T4 in FIG. 8, in one embodiment, the feedback compensation circuit 32 can generate the compensation signal VCOMP at the multifunction pin COMP, such that the switch control signal generation circuit 33 of the power switch controller circuit 30 can generate the switch control signal GATE according to the compensation signal VCOMP, to control the power switch N1. Consequently, the power switch N1 can control the switching regulator to convert the input voltage VIN to the output voltage VOUT.

Since the controller supply voltage VDD has reached a level required for the normal operation of the power switch controller circuit 30, the power switch controller circuit 30 can start controlling the power switch N1 (i.e., the switch control signal GATE begins to be in a form of, for example but not limited to, a PWM type switching signal). Consequently, the output voltage VOUT as well as the auxiliary voltage VAUX begins to be raised, to continually supply the controller supply voltage VDD. Besides, in one embodiment, the start-up voltage threshold VTH has a hysteresis range, such that when the controller supply voltage VDD decreases below the normal operation voltage, the threshold is VTHOFF in FIG. 8 for the start-up switch SSU to be turned ON again (as shown by 8), to re-enter a start-up stage (e.g., from time point T4 to T5). Subsequently, a reset stage is entered again (e.g., from time point T5 to T6).

Figure 9:
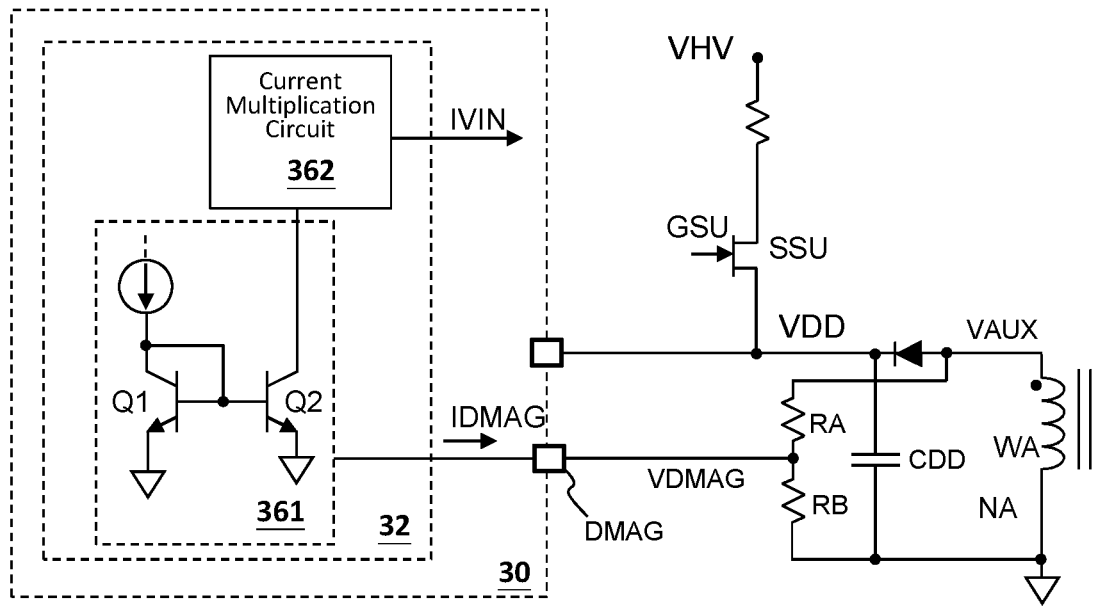
FIG. 9 shows a schematic diagram of a switching regulator and a feedback compensation circuit thereof according to an embodiment of the present invention.

In one embodiment, under a situation where the controller supply voltage VDD exceeds the start-up voltage threshold VTH, the feedback compensation circuit 32 of the power switch controller circuit 30 can receive the auxiliary sensing signal VDMAG via the auxiliary sensing pin DMAG, to obtain information related to the input voltage VIN (input voltage related information). Please refer to FIG. 9, which shows a schematic diagram of a switching regulator and a feedback compensation circuit 32 thereof according to an embodiment of the present invention. The feedback compensation circuit 32 includes a current generation circuit 361 and a current multiplication circuit 362. The current generation circuit 361 is configured to, under a situation where the power switch N1 is ON, operably control a voltage level of the auxiliary sensing pin DMAG to be substantially at a predetermined voltage level (for example but not limited to 0V), and to operably generate an auxiliary sensing current IDMAG at the auxiliary sensing pin DMAG according to the auxiliary sensing signal VDMAG. In one embodiment, as shown in FIG. 9, the current generation circuit 361 can include a pair of common-base transistors (i.e., Q1 and Q2). The emitter voltage of the transistor Q1 is substantially the same as the emitter voltage of the transistor Q2. In this embodiment, both of the above-mentioned emitter voltages are substantially equal to ground. The current multiplication circuit 362 is configured to operably generate an input voltage related current IVIN according to the auxiliary sensing current IDMAG. The input voltage related current IVIN is related to the input voltage VIN. From one perspective, the auxiliary sensing current IDMAG is related to the input voltage VIN too. In one embodiment, the current multiplication circuit 362 can be, for example but not limited to, a current mirror.

Figure 10:
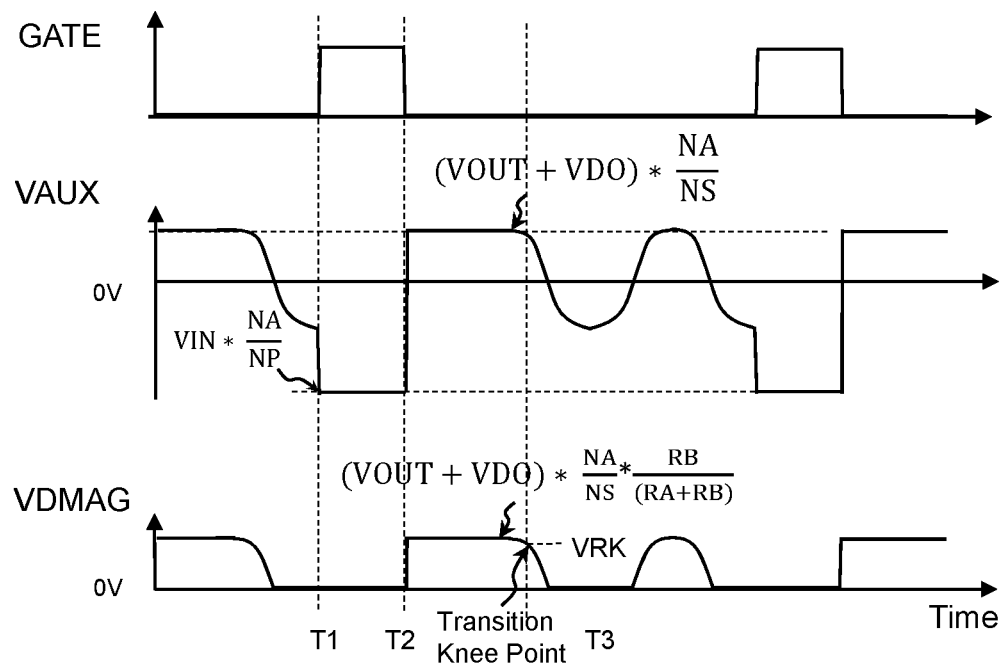
FIG. 10 shows waveforms corresponding to a switching regulator of the present invention.

Please refer to FIG. 9 in conjugation with FIG. 10. FIG. 10 shows waveforms corresponding to a switching regulator of the present invention. As shown in FIG. 10, when the power switch N1 is ON (as shown from time point T1 to T2 in FIG. 10), the level of the auxiliary voltage VAUX can be represented as Equation 1:

$$VAUX=VIN*NA/NP \qquad [\text{Equation 1}],$$

wherein NA/NP denotes the turn ratio of the auxiliary winding WA to the inductor W1.

Because in the embodiment shown in FIG. 9, when the power switch N1 is ON, the current generation circuit 361 controls the voltage level (i.e., the auxiliary sensing signal VDMAG) of the auxiliary sensing pin DMAG to be substantially 0V, the level of the auxiliary sensing current IDMAG can be represented as Equation 2:

$$IDMG=(VDAMG-VAUX)/RA=(VIN*NA/NP)/RA \qquad [\text{Equation 2}].$$

In this embodiment, the current multiplication circuit 362 multiplies the auxiliary sensing current IDMAG by K (via for example but not limited to a K-fold current mirror) to generate the input voltage related current IVIN, which can be represented as Equation 3:

$$IVIN=K*IDMG \qquad [\text{Equation 3}].$$

Accordingly, the input voltage related current IVIN is proportional to the input voltage VIN. In one embodiment, the switching regulator of the present invention can operate according to the above-mentioned input voltage related information (e.g., the input voltage related current IVIN) to generate the switch control signal GATE to regulate the output voltage VOUT to a predetermined voltage level, wherein the input voltage related information functions as a feedback signal.

In one embodiment, under a situation where the power switch N1 is OFF, the feedback compensation circuit 32 can obtain information related to the output voltage VOUT (output voltage related information) according to the auxiliary sensing signal VDMAG. Please still refer to FIG. 10. When the power switch N1 is OFF (as shown from time point T2 to T3 in FIG. 10), the level of the auxiliary voltage VAUX can be represented as Equation 4:

$$VAUX=(VOUT+VDO)*NA/NS \qquad [\text{Equation 4}],$$

wherein NA/NS denotes the turn ratio of the auxiliary winding WA to the secondary winding W2; VDO denotes the forward voltage of the secondary side diode DO.

The auxiliary sensing signal VDMAG is a divided voltage of the auxiliary voltage VAUX, which can be represented as Equation 5:

$$VDMAG=VAUX*RB/(RA+RB) \qquad [\text{Equation 5}].$$

As such, the feedback compensation circuit 32 of the switching regulator of the present invention can obtain information related to the output voltage VOUT according to the auxiliary sensing signal VDMAG, and use the information related to the output voltage VOUT as a feedback signal. In one embodiment, the switching regulator of the present invention can operate according to the above-mentioned output voltage related information (e.g., the auxiliary sensing signal VDMAG).

Figure 11:
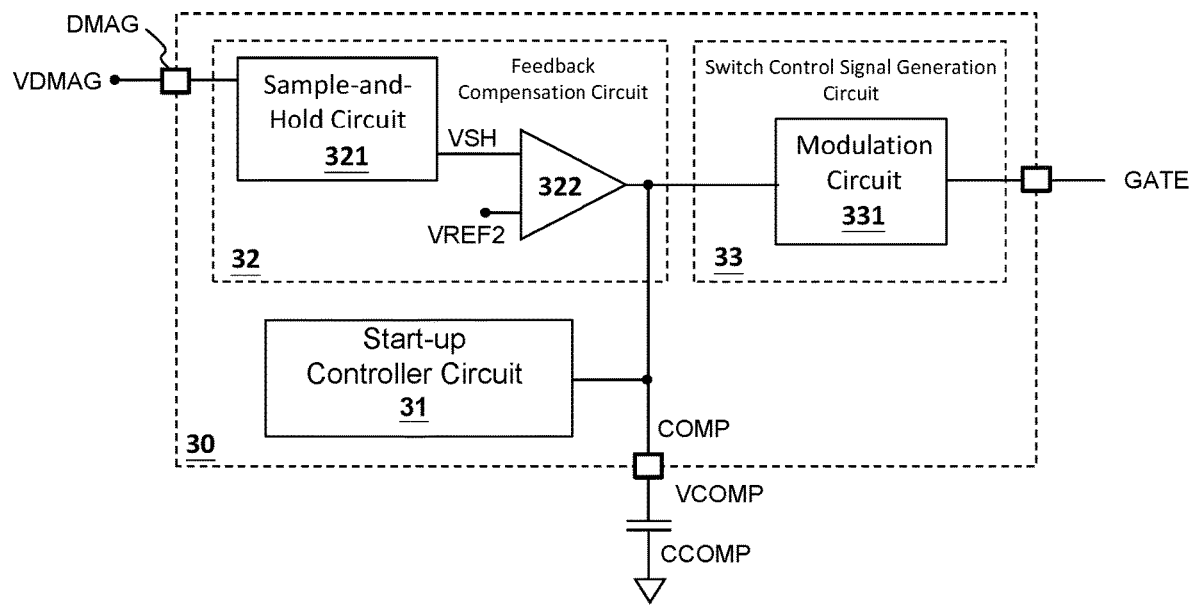
FIG. 11 shows a schematic diagram of a switching regulator and a feedback compensation circuit and a switch control signal generation circuit thereof according to a specific embodiment of the present invention.

In one embodiment, the switching regulator of the present invention can regulate the output voltage VOUT by feedback control according to the above-mentioned output voltage related information (e.g., the auxiliary sensing signal VDMAG). Please refer to FIG. 11, which shows a schematic diagram of a switching regulator (i.e., switching regulator 30) and a feedback compensation circuit and a switch control signal generation circuit thereof according to a specific embodiment of the present invention. In this embodiment, the feedback compensation circuit 32 includes a sample-and-hold circuit 321 and an error amplifier circuit 322. The sample-and-hold circuit 321 is configured to, under a situation where the power switch N1 is OFF, operably sample and hold the auxiliary sensing signal VDMAG, to generate a sample-and-hold signal VSH. The error amplifier circuit 322 is configured to operably generate the compensation signal VCOMP according to the sample-and-hold signal VSH and a reference signal VREF2. A modulation circuit 331 is configured to operably modulate the compensation signal COMP (for example by PWM type modulation) to generate the switch control signal GATE, to regulate the output voltage VOUT by feedback control.

Figure 12:
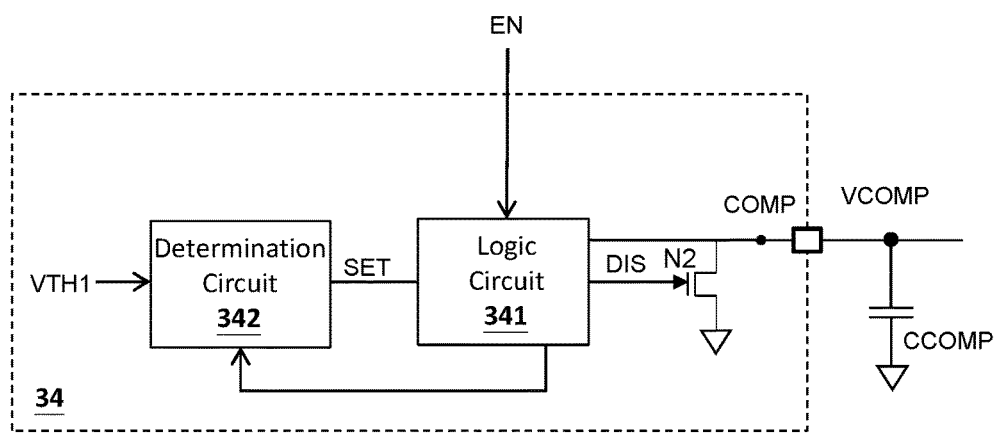
FIG. 12 shows an embodiment of a reset circuit of the present invention.

Please refer to FIG. 12, which shows an embodiment of a reset circuit (i.e., reset circuit 34) of the present invention. In this embodiment, the reset circuit 34 includes: a logic circuit 341, a reset switch N2 and a determination circuit 342. The logic circuit 341 is configured to operably generate a reset control signal DIS according to a setting signal SET after the controller supply voltage VDD has been raised above the start-up voltage threshold VTH. The reset switch N2 is coupled to the multifunction pin COMP and the logic circuit 341. The reset switch N2 is configured to operably reset the multifunction pin voltage (i.e., the compensation signal VCOMP) to the reset voltage (as shown by the reset voltage VTH0 in FIG. 8) according to the reset control signal DIS. The determination circuit 342 is coupled to the logic circuit 341. The determination circuit 342 is configured to operably generate the setting signal SET according to the multifunction pin voltage (i.e., the compensation signal VCOMP) and a reset voltage threshold VTH1. After the controller supply voltage VDD has been raised above the start-up voltage threshold VTH and when the multifunction pin voltage (i.e., the compensation signal VCOMP) is higher than the reset voltage threshold VTH1, the setting signal SET will cause the reset control signal DIS to turn ON the reset switch N2, thereby resetting the multifunction pin voltage (i.e., the compensation signal VCOMP) to the reset voltage VTH0. After the multifunction pin voltage (i.e., the compensation signal VCOMP) drops to the reset voltage threshold VTH1, the setting signal SET will cause the reset control signal DIS to turn OFF the reset switch N2, thereby ceasing resetting the multifunction pin voltage (i.e., the compensation signal VCOMP) to the reset voltage VTH0. The reset voltage VTH0 can be, for example but not limited to, equal to the reset voltage threshold VTH1.

In this embodiment, the switching regulator can generate an enable signal EN according to for example a falling edge of the comparison output signal CPO, to indicate that the controller supply voltage VDD has been raised above a start-up voltage threshold VTH, and thus enabling the logic circuit 341 to determine whether to turn ON the reset switch N2 according to the setting signal SET. The logic circuit 341 can include, for example but not limited to, a SR flip-flop. The determination circuit 342 can include, for example but not limited to, a comparison circuit, which is configured to operably compare the multifunction pin voltage (i.e., the compensation signal VCOMP) with the reset voltage threshold VTH1, to generate the setting signal SET, whereby after the multifunction pin voltage (i.e., the compensation signal VCOMP) drops to the reset voltage threshold VTH1, the reset control signal DIS will turn OFF the reset switch N2. The logic circuit 341, the reset switch N2 and the determination circuit 342 may be implemented in various ways, as long as they can fulfill the aforementioned functions, and the present invention is not limited to any specific forms of these circuits.

In one embodiment, when the controller supply voltage VDD exceeds a start-up voltage threshold VTH, the feedback compensation circuit 32 can receive a current sensing signal VCS via a current sensing pin CS, to obtain information related to the output voltage VOUT. Please refer to FIG. 14, which shows a schematic diagram of a switching regulator 30 and a feedback compensation circuit thereof according to an embodiment of the present invention. The power switch controller circuit 30 includes a multifunction pin COMP, an auxiliary sensing pin DMAG, a current sensing pin CS, a start-up controller circuit 31, a feedback compensation circuit 32 and a switch control signal generation circuit 33. The feedback compensation circuit 32 is coupled to the power switch N1 via the current sensing pin CS, so as to obtain a current sensing signal VCS (which functions as a feedback signal) according to a switch current flowing through the power switch N1.

Figure 14:
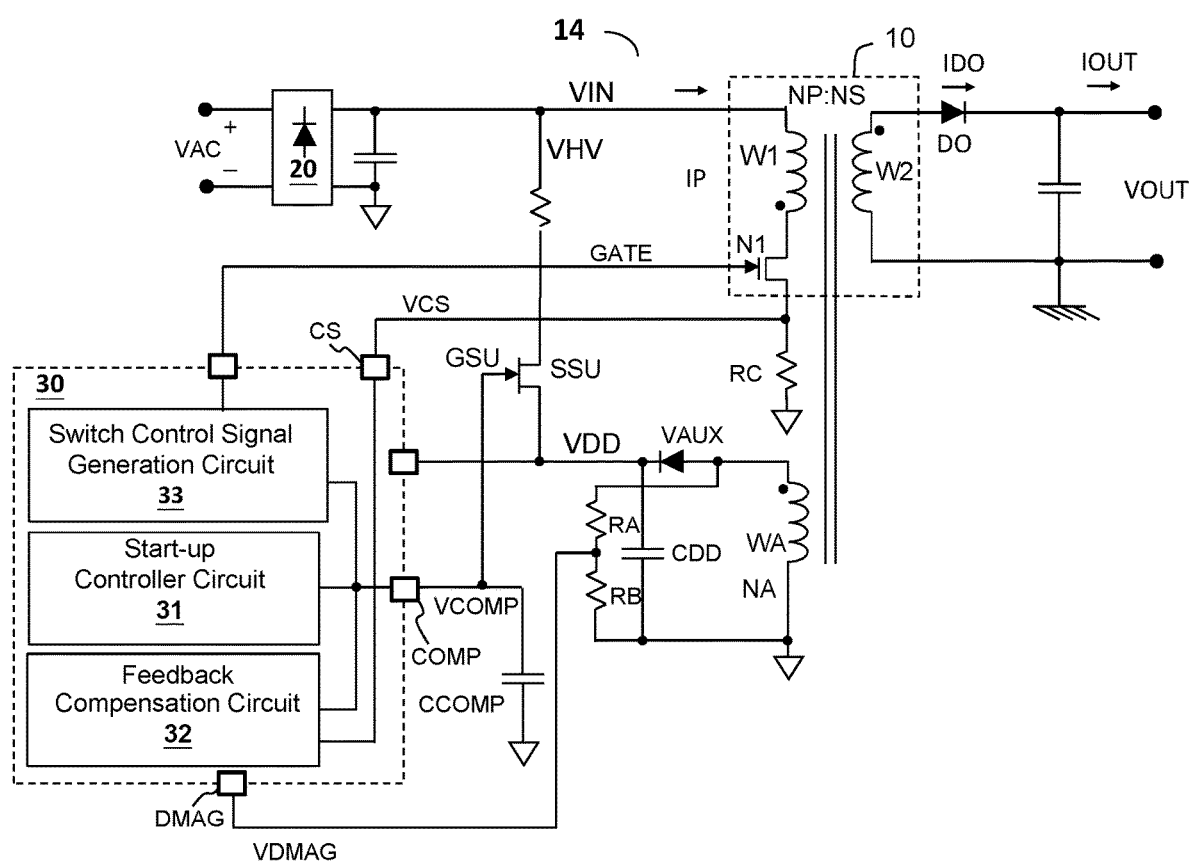
FIG. 14 shows a schematic diagram of a switching regulator and a feedback compensation circuit thereof according to an embodiment of the present invention.
Figure 15:
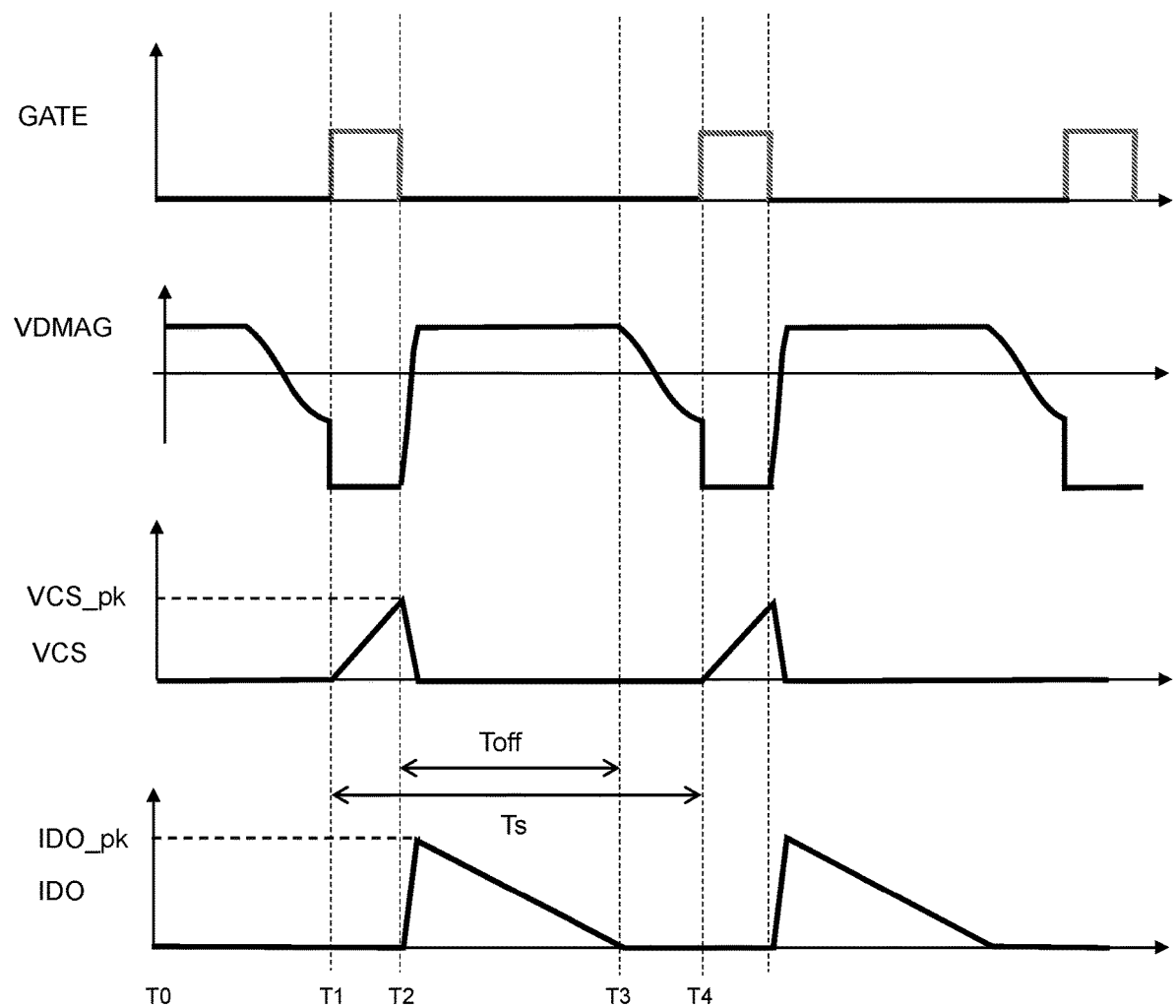
FIG. 15 shows waveforms corresponding to a switching regulator of the present invention.

Please refer to FIG. 14 in conjugation with FIG. 15. FIG. 15 shows waveforms corresponding to a switching regulator of the present invention. As shown in FIG. 15, when the power switch N1 is OFF and before a knee time point of the auxiliary sensing signal VDMAG (e.g. as shown from time point T2 to T3 in FIG. 15), the level of the auxiliary voltage VAUX can be represented as Equation 6:

$$VAUX=(VOUT+VDO)*NA/NS \quad \text{[Equation 6]},$$

wherein NA/NS denotes the turn ratio of the auxiliary winding WA to the secondary winding W2.

In the embodiment shown in FIG. 14, the level of the output current IOUT can be represented as Equation 7:

$$IOUT=\tfrac{1}{2}*(Toff/Ts)*IDO\_pk=\tfrac{1}{2}*(Toff/Ts)*(NP/NS)*(VCS\_pk/RC) \quad \text{[Equation 7]}.$$

In one embodiment, the switching regulator of the present invention can operate according to information related to the output current IOUT (output current related information, which for example can be the current sensing signal VCS which is related to the output current IOUT), wherein Toff denotes the period from time point T2 to T3; Ts denotes the period from time point T1 to 14; IDO_pk denotes the maximum level of the secondary diode current IDO; NA/NS denotes the turn ratio of the auxiliary winding WA to the secondary winding W2; and wherein the current sensing signal VCS is related to for example the voltage-drop across the resistor RC due to a switch current (which flows through the power switch N1) flowing through the resistor RC; the current sensing signal peak VCS_pk denotes the maximum level of the current sensing signal VCS. In this embodiment, the switching regulator can generate the switch control signal GATE to regulate the output current IOUT to a predetermined current level according to the output current related information (e.g., the current sensing signal VCS), which functions as a feedback signal.

As described above, the switching regulator of the present invention can control the start-up switch SSU via the multifunction pin COMP during the start-up stage, so as to rapidly raise the level of the controller supply voltage VDD to complete the start-up stage, and after the start-up stage has been completed, the switching regulator of the present invention can perform another function via the multifunction pin COMP. Consequently and desirably, the size of the IC chip and the manufacturing cost of the present invention are reduced. After the start-up stage has been completed, the multifunction pin voltage (i.e., the compensation signal VCOMP) of the multifunction pin COMP should not turn ON the start-up switch. In one embodiment, the switching regulator of the present invention can determine a voltage range of the compensation signal VCOMP according to the conduction threshold of the start-up switch SSU. For example, in the embodiment shown in FIG. 2A, the sample-and-hold circuit 321 and the error amplifier circuit 322 of the feedback compensation circuit 32 can be designed according to the conduction threshold of the start-up switch SSU, to ensure that within the voltage range of the compensation signal VCOMP, the start-up switch SSU will not be turned ON.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described herein before to be used alone; under the spirit of the present invention, two or more of the embodiments described hereinbefore can be used in combination. For example, two or more of the embodiments can be used together, or, a part of one embodiment can be used to replace a corresponding part of another embodiment. For example, the embodiment wherein "the compensation signal VCOMP is generated according to the auxiliary sensing signal VDMAG" and the embodiment wherein "the compensation capacitor CCOMP is coupled to the multifunction pin COMP to be discharged" can be used together. Consequently, the switching regulator of the present invention can possess both of the above two functions at the same time, in addition to operating under a start-up mode via the multifunction pin COMP. In view of the foregoing, the spirit of the present invention should cover all such and other modifications and variations, which should be interpreted to fall within the scope of the following claims and their equivalents.

What is claimed is:

1. A switching regulator, comprising:
a power stage circuit, including an inductor and at least one power switch; wherein the least one power switch is coupled to the inductor and is configured to operate according to a switch control signal, to control a conduction status of the inductor, thereby converting an input power to an output power;
an auxiliary winding, wherein the auxiliary winding and the inductor form a transformer, to generate a controller supply voltage;
a start-up switch coupled between an input voltage related signal and the controller supply voltage, wherein the input voltage related signal is related to an input voltage of the input power; and
a power switch controller circuit coupled to the power stage circuit, wherein the power switch controller circuit is powered by the controller supply voltage and is configured to operably generate the switch control signal, and, wherein the power switch controller circuit is configured to operably control the start-up switch, the power switch controller circuit including:
a multifunction pin, which is coupled to a control terminal of the start-up switch and which is configured to operably deliver different signals with different functions under at least two different modes, respectively;
a start-up controller circuit, which is coupled to a control terminal of the start-up switch via the multifunction pin and which is configured to operably generate a start-up signal under a start-up mode, wherein the start-up signal is delivered to the control terminal of the start-up switch through the multifunction pin, so that when the controller supply voltage does not exceed a start-up voltage threshold, the start-up controller circuit controls the start-up switch to be ON, and when the controller supply voltage exceeds the start-up voltage threshold, the start-up controller circuit controls the start-up switch to be OFF; and
a feedback compensation circuit, which includes an error amplifier circuit, wherein an output terminal of the feedback compensation circuit is coupled to the multifunction pin, the feedback compensation circuit being configured to operably generate a compensation signal at the multifunction pin under an operation mode, so that when the controller supply voltage exceeds the start-up voltage threshold, the power switch controller circuit generates the switch control signal according to the compensation signal.

2. The switching regulator of claim 1, further comprising: a blocking diode coupled to the start-up switch, wherein the blocking diode is configured to operably block a backflow current and/or lower down a withstand voltage of the start-up switch.

3. The switching regulator of claim 1, wherein when the controller supply voltage exceeds the start-up voltage threshold, the feedback compensation circuit generates the compensation signal according to a feedback signal; wherein the feedback signal is related to the output power.

4. The switching regulator of claim 3, wherein the power switch controller circuit further includes an auxiliary sensing pin, and wherein the feedback compensation circuit is coupled to the auxiliary winding via the auxiliary sensing pin, so that the feedback compensation circuit receives the feedback signal from the auxiliary winding.

5. The switching regulator of claim 4, wherein the feedback compensation circuit further includes a sample-and-hold circuit, which is configured to, under a situation where the power switch is OFF, operably sample and hold the feedback signal, to generate a sample-and-hold signal; wherein the error amplifier circuit is configured to operably generate the compensation signal according to the sample-and-hold signal and a reference signal.

6. The switching regulator of claim 3, wherein the power switch controller circuit further includes a current sensing pin, and wherein the feedback compensation circuit is coupled to the power switch via the current sensing pin, so as to obtain the feedback signal according to a switch current flowing through the power switch.

7. The switching regulator of claim 1, wherein the input voltage related signal is directly coupled to the input voltage.

8. The switching regulator of claim 1, further comprising: a rectifying circuit, which is configured to operably rectify an AC input signal to generate the input voltage, wherein the input voltage related signal is coupled to a positive-phase terminal or a negative-phase terminal of the AC input signal.

9. The switching regulator of claim 1, wherein the start-up controller circuit includes:
a comparison circuit, which is configured to operably compare the controller supply voltage with a start-up reference voltage, to generate the start-up signal, wherein a level of the start-up reference voltage is related to the start-up voltage threshold; and
a start-up control switch having a current input terminal and a current output terminal coupled between the controller supply voltage and the multifunction pin, wherein a control terminal of the start-up control switch is electrically connected to the start-up signal; wherein when the controller supply voltage does not exceed the start-up voltage threshold, the start-up control switch is controlled to be ON, thereby conducting the start-up switch; and wherein when the controller supply voltage exceeds the start-up voltage threshold, the start-up control switch is controlled to be OFF, thereby controlling the start-up switch to be OFF.

10. The switching regulator of claim 1, wherein the power switch controller circuit further includes a reset circuit coupled to the multifunction pin, and wherein after the controller supply voltage has been raised above the start-up voltage threshold, the reset circuit is configured to operably reset a multifunction pin voltage of the multifunction pin to a reset voltage during a reset stage.

11. The switching regulator of claim 1, wherein the reset circuit includes:
   a logic circuit, which is configured to operably generate a reset control signal according to a setting signal after the controller supply voltage has been raised above the start-up voltage threshold;
   a reset switch, which is coupled to the multifunction pin and the logic circuit, the reset switch being configured to operably reset the multifunction pin voltage to the reset voltage according to the reset control signal; and
   a determination circuit coupled to the logic circuit, wherein the determination circuit is configured to operably generate the setting signal according to the multifunction pin voltage and a reset voltage threshold;
   wherein after the controller supply voltage has been raised above the start-up voltage threshold and when the multifunction pin voltage is higher than the reset voltage threshold, the setting signal causes the reset control signal to turn ON the reset switch, thereby resetting the multifunction pin voltage to the reset voltage;
   wherein after the multifunction pin voltage drops to the reset voltage threshold, the setting signal causes the reset control signal to turn OFF the reset switch, thereby ceasing resetting the multifunction pin voltage to the reset voltage.

12. The switching regulator of claim 1, wherein the power switch controller circuit further includes a soft-start circuit coupled to the feedback compensation circuit; wherein after the start-up mode has completed, under the operation mode, the soft-start circuit is configured to operably execute a soft-start procedure, to limit an elevation speed of a multifunction pin voltage of the multifunction pin, thereby controlling an elevation speed of the output voltage.

13. The switching regulator of claim 1, wherein the power switch controller circuit further includes a switch control signal generation circuit coupled to the feedback compensation circuit; wherein the switch control signal generation circuit is configured to operably generate the switch control signal in a form of pulse width modulation (PWM), to control the power switch, thereby controlling the conduction status of the inductor.

14. A power switch controller circuit which is configured to operably control a switching regulator, the switching regulator including: a power stage circuit including an inductor and at least one power switch, wherein the least one power switch is coupled to the inductor, the power stage circuit being configured to operably operates according to a switch control signal, to control a conduction status of the inductor, thereby converting an input power to an output power; an auxiliary winding, wherein the auxiliary winding and the inductor form a transformer, to generate a controller supply voltage; a start-up switch coupled between an input voltage related signal and the controller supply voltage, wherein the input voltage related signal is related to an input voltage of the input power; and the power switch controller circuit coupled to the power stage circuit, wherein the power switch controller circuit is powered by the controller supply voltage and is configured to operably generate the switch control signal, and, wherein the power switch controller circuit is configured to operably control the start-up switch, the power switch controller circuit comprising:
   a multifunction pin, which is coupled to a control terminal of the start-up switch and which is configured to operably deliver different signals with different functions under at least two different modes, respectively;
   a start-up controller circuit, which is coupled to a control terminal of the start-up switch via the multifunction pin and which is configured to operably generate a start-up signal under a start-up mode, wherein the start-up signal is delivered to the control terminal of the start-up switch through the multifunction pin, so that when the controller supply voltage does not exceed a start-up voltage threshold, the start-up controller circuit controls the start-up switch to be ON, and when the controller supply voltage exceeds the start-up voltage threshold, the start-up controller circuit controls the start-up switch to be OFF; and
   a feedback compensation circuit, which includes an error amplifier circuit, wherein an output terminal of the feedback compensation circuit is coupled to the multifunction pin, the feedback compensation circuit being configured to operably generate a compensation signal at the multifunction pin under an operation mode, so that when the controller supply voltage exceeds the start-up voltage threshold, the power switch controller circuit generates the switch control signal according to the compensation signal.

15. The power switch controller circuit of claim 14, wherein the switching regulator further comprises: a blocking diode coupled to the start-up switch, wherein the blocking diode is configured to operably block a backflow current and/or lower down a withstand voltage of the start-up switch.

16. The power switch controller circuit of claim 14, wherein when the controller supply voltage exceeds the start-up voltage threshold, the feedback compensation circuit generates the compensation signal according to a feedback signal; wherein the feedback signal is related to the output power.

17. The power switch controller circuit of claim 16, further comprising: an auxiliary sensing pin, and wherein the feedback compensation circuit is coupled to the auxiliary winding via the auxiliary sensing pin, so that the feedback compensation circuit receives the feedback signal from the auxiliary winding.

18. The power switch controller circuit of claim 17, wherein the feedback compensation circuit further includes a sample-and-hold circuit, which is configured to, under a situation where the power switch is OFF, operably sample and hold the feedback signal, to generate a sample-and-hold signal; wherein the error amplifier circuit is configured to operably generate the compensation signal according to the sample-and-hold signal and a reference signal.

19. The power switch controller circuit of claim 16, further comprising: a current sensing pin, and wherein the feedback compensation circuit is coupled to the power switch via the current sensing pin, so as to obtain the feedback signal according to a switch current flowing through the power switch.

20. The power switch controller circuit of claim 14, wherein the input voltage related signal is directly coupled to the input voltage.

21. The power switch controller circuit of claim 14, wherein the switching regulator further comprises: a rectifying circuit, which is configured to operably rectify an AC input signal to generate the input voltage, wherein the input voltage related signal is coupled to a positive-phase terminal or a negative-phase terminal of the AC input signal.

22. The power switch controller circuit of claim 14, wherein the start-up controller circuit includes:

a comparison circuit, which is configured to operably compare the controller supply voltage with a start-up reference voltage, to generate the start-up signal, wherein a level of the start-up reference voltage is related to the start-up voltage threshold; and a start-up control switch having a current input terminal and a current output terminal coupled between the controller supply voltage and the multifunction pin, wherein a control terminal of the start-up control switch is electrically connected to the start-up signal; wherein when the controller supply voltage does not exceed the start-up voltage threshold, the start-up control switch is controlled to be ON, thereby conducting the start-up switch; and wherein when the controller supply voltage exceeds the start-up voltage threshold, the start-up control switch is controlled to be OFF, thereby controlling the start-up switch to be OFF.

23. The power switch controller circuit of claim 14, further comprising: a reset circuit coupled to the multifunction pin, and wherein after the controller supply voltage has been raised above the start-up voltage threshold, the reset circuit is configured to operably reset a multifunction pin voltage of the multifunction pin to a reset voltage during a reset stage.

24. The power switch controller circuit of claim 23, wherein the reset circuit includes:

a logic circuit, which is configured to operably generate a reset control signal according to a setting signal after the controller supply voltage has been raised above the start-up voltage threshold;

a reset switch, which is coupled to the multifunction pin and the logic circuit, respectively, the reset switch being configured to operably reset the multifunction pin voltage to the reset voltage according to the reset control signal; and a determination circuit coupled to the logic circuit, wherein the determination circuit is configured to operably generate the setting signal according to the multifunction pin voltage and a reset voltage threshold;

wherein after the controller supply voltage has been raised above the start-up voltage threshold and when the multifunction pin voltage is higher than the reset voltage threshold, the setting signal causes the reset control signal to turn ON the reset switch, thereby resetting the multifunction pin voltage to the reset voltage;

wherein after the multifunction pin voltage drops to the reset voltage threshold, the setting signal causes the reset control signal to turn OFF the reset switch, thereby ceasing resetting the multifunction pin voltage to the reset voltage.

25. The power switch controller circuit of claim 14, further comprising: a soft-start circuit coupled to the feedback compensation circuit; wherein after the start-up mode has completed, under the operation mode, the soft-start circuit is configured to operably execute a soft-start procedure, to limit an elevation speed of a multifunction pin voltage of the multifunction pin, thereby controlling an elevation speed of the output voltage.

26. The power switch controller circuit of claim 14, further comprising: a switch control signal generation circuit coupled to the feedback compensation circuit; wherein the switch control signal generation circuit is configured to operably generate the switch control signal in a form of pulse width modulation (PWM), to control the power switch, thereby controlling the conduction status of the inductor.

* * * * *